(12) United States Patent
Yang et al.

(10) Patent No.: US 10,845,870 B2
(45) Date of Patent: Nov. 24, 2020

(54) TIME-OF-FLIGHT HEAD MOVEMENT MEASUREMENT FOR WEARABLE DEVICE

(71) Applicant: STMICROELECTRONICS, INC., Coppell, TX (US)

(72) Inventors: Xiaoyong Yang, San Jose, CA (US); Rui Xiao, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 0 days.

(21) Appl. No.: 16/101,131

(22) Filed: Aug. 10, 2018

(65) Prior Publication Data

US 2019/0212813 A1 Jul. 11, 2019

Related U.S. Application Data

(60) Provisional application No. 62/614,315, filed on Jan. 5, 2018.

(51) Int. Cl.
*G06F 3/01* (2006.01)
*G02B 27/01* (2006.01)
*G02B 27/00* (2006.01)

(52) U.S. Cl.
CPC ......... *G06F 3/012* (2013.01); *G02B 27/0093* (2013.01); *G02B 27/017* (2013.01); *G02B 27/0172* (2013.01); *G02B 2027/014* (2013.01); *G02B 2027/0138* (2013.01); *G02B 2027/0187* (2013.01)

(58) Field of Classification Search
CPC combination set(s) only.
See application file for complete search history.

(56) References Cited

U.S. PATENT DOCUMENTS

| | | | |
|---|---|---|---|
| D876,616 S * | 2/2020 | Prentice | D24/110.1 |
| 2012/0092172 A1 * | 4/2012 | Wong | G06F 3/011 340/575 |
| 2014/0243686 A1 * | 8/2014 | Kimmel | A61B 5/1114 600/476 |
| 2015/0367092 A1 * | 12/2015 | Goff | A61M 16/0057 128/204.23 |
| 2017/0351336 A1 * | 12/2017 | Yang | G06F 3/041 |

* cited by examiner

*Primary Examiner* — Van N Chow
(74) *Attorney, Agent, or Firm* — Seed IP Law Group LLP

(57) ABSTRACT

The present disclosure is directed to a system and method of determining a movement of a user's head with a ranging sensor. The ranging sensor transmits a ranging signal that is reflected off of a user's shoulder and received back at the ranging sensor. The received ranging signal can be used to determine distance between the user's head and the user's shoulder or to determine the reflectivity of the user's shoulder. With the distance or the reflectivity, a processor can be used to determine movement of the user's head. Furthermore, a multiple zone ranging sensor or multiple ranging sensors can be used to detect the user's shoulder in different spatial zones.

18 Claims, 19 Drawing Sheets

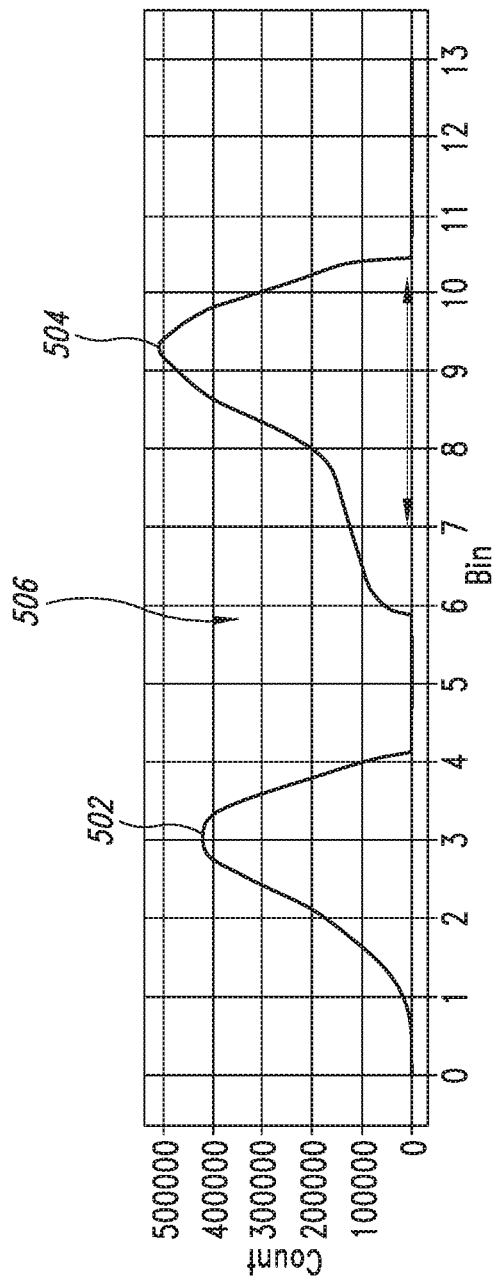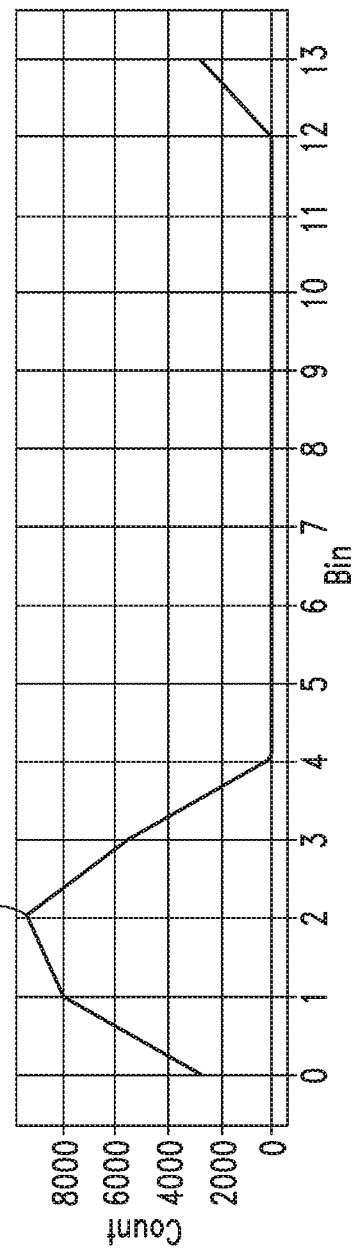
FIG. 5A
FIG. 5B

TIME-OF-FLIGHT HEAD MOVEMENT MEASUREMENT FOR WEARABLE DEVICE

TECHNICAL FIELD

The present disclosure relates generally to head movement measurements for use in electronic systems, and is directed more specifically to head movement measurements through time-of-flight sensing and control of electronic systems based upon the head movement measurements.

DESCRIPTION OF THE RELATED ART

Wearable display devices have been developed that allow a user to consume content in a more efficient and engrossing manner. These wearable display devices include virtual reality (VR) and augmented reality (AR) headsets. VR headsets generate a three dimensional simulated environment and in some versions allow the user to use the VR headset to observe or interact with the simulated environment through head motions. AR headsets similarly generate a three dimensional simulated environment, with the addition of the real world being superimposed with the simulated environment. The AR systems can either optically transmit the real world to the user, such as with Google Glass, or can digitally transmit the real world to the user, such as pass through on the HTC Vive. Wearable display devices that allow the user to manipulate the content with head movements require precise position tracking of the user's head to properly display content. If the content becomes unsynchronized with the user's head movement the user experience is degraded, and can even cause physiological problems with the user, such as motion sickness or vertigo.

Motion tracking wearable display devices use internal position sensors to determine a position of a user's head. These positions sensors are made up of accelerometers and gyroscopes (in one, two, three, or more axes) that use inertial and gravitational forces to determine the position of the user's head. When the user changes the pitch, yaw, or roll of their head, these changes are detected by the internal position sensors by sensing the change in the vector of the force of gravity or by monitoring how inertial sensing masses change in position. For example, a gyroscope will output an angle rate indicating the rotational velocity around an axis. This can be integrated to determine an angular position. Thus, a 32 degree/second angular rate for 1.5 seconds will yield an angular position of 48 degrees if a starting condition of 0 degrees is known. Thus, these position sensors are typically well suited to detect large movements, such as a 10-20 degree change in position, but struggle with smaller and slower position changes that produce minimal changes in forces. Additionally, these sensors can be subject to error from improper initial calibration or drift over time as they rely on internal references. These issues can be exacerbated by changes in temperature or power supply, or by mechanical degradation of the sensors.

BRIEF SUMMARY

The present disclosure is directed to a system, device, and method for determining a position of a head of a user by detecting a distance between a ranging sensor on a wearable device and a body of the user. Some embodiments incorporate a ranging sensor that provides data to a processor, the ranging sensor and the processor being mounted on a supporting structure of the wearable device. The processor determines, based at least in part on the ranging data from the ranging sensor, the position of the head of the user relative to the body. In some embodiments the processor determines the position of the head by detecting a distance to a shoulder of the user or by detecting a reflectivity of a ranging signal from the ranging sensor reflected off the shoulder of the user. Using at least the ranging sensor data, the processor can detect pitch (look up/down), yaw (rotate), or roll (tilt).

In some embodiments, the ranging sensor is one or more individual ranging sensors, and each of the one or more ranging sensors may have one or more detection zones. In some embodiments, the processor combines the ranging data and position data from internal reference position sensors such as gyroscopes or accelerometers. In some embodiments the system, device, and method include a display that displays content to the user, the processor configured to change the camera angle of the content presented on the display. In some embodiments the system, device, and method include a speaker that generates a sound for the user, the processor being configured to change the source channel of multichannel audio content.

BRIEF DESCRIPTION OF THE SEVERAL VIEWS OF THE DRAWINGS

FIGS. 5A and 5B are graphs illustrating operation of the TOF ranging sensor of FIG. 2 in detecting multiple objects within the field of view of the TOF ranging sensor of FIGS. 2 and 3.

DETAILED DESCRIPTION

Figure 1:
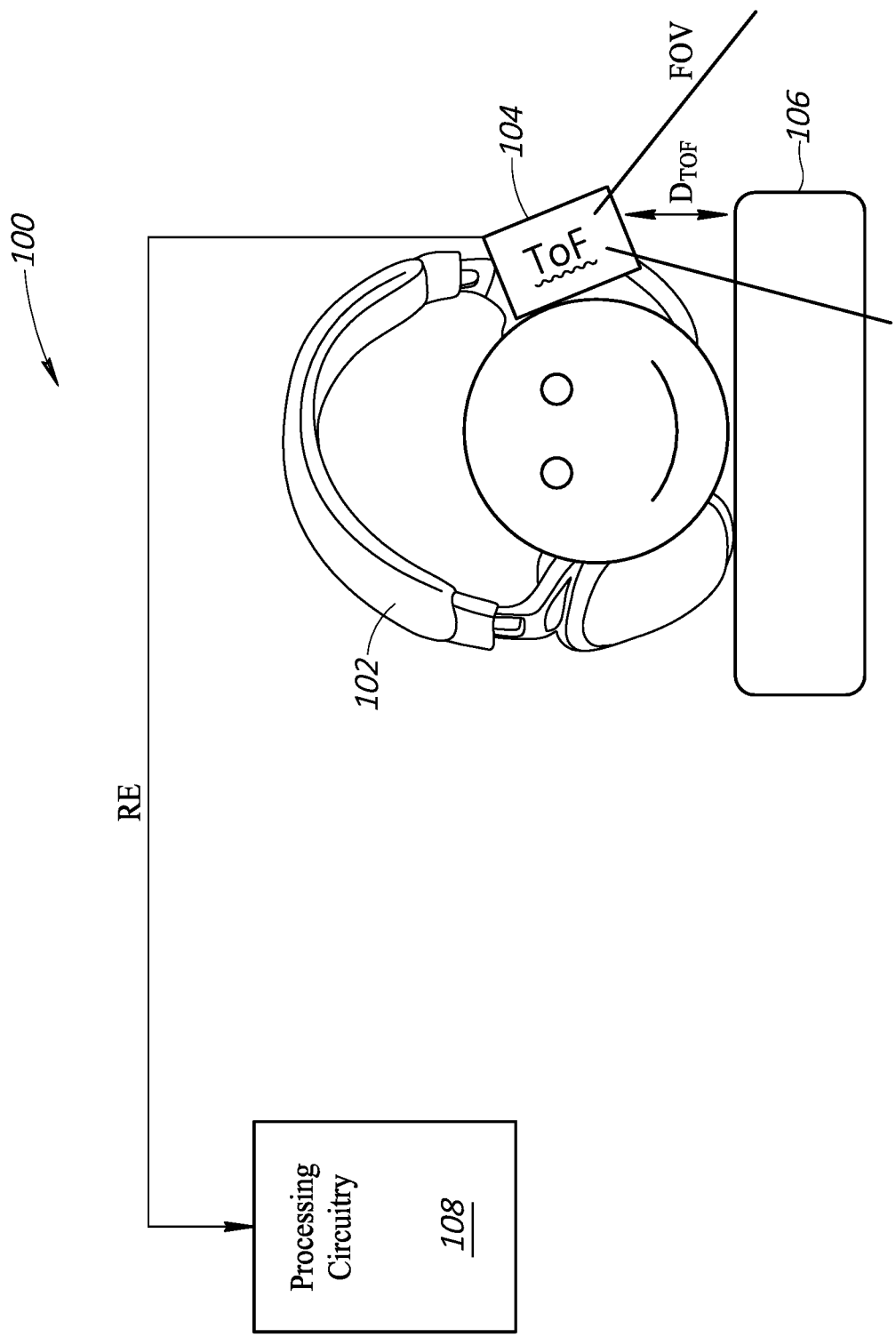
FIG. 1 is a functional block diagram of a head movement measurement control system, according to one embodiment of the present disclosure.

In the present description, certain details are set forth in conjunction with the described embodiments to provide a sufficient understanding of the present disclosure. One skilled in the art will appreciate, however, that the other embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components or processes has not been shown or described in detail below to avoid unnecessarily obscuring the present disclosure.

Unless the context requires otherwise, throughout the specification and claims that follow, the word "comprise" and variations thereof, such as "comprises" and "comprising," are to be construed in an open, inclusive sense; that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

The present disclosure is directed to a system, device, and method for determining a position of a head of a user relative to their body. A head movement detection system uses a ranging sensor coupled to a wearable device to project a ranging signal towards the body of the user. A processor determines, based at least in part on the ranging data from the ranging sensor, the position of the head of the user relative to the body. In one example, the ranging sensor projects towards a shoulder of the user and the processor determines head movement based on detected movement of the shoulder relative to the ranging sensor. The ranging sensor can produce a distance or a reflectivity value, either of which can be used by the processor to determine the head position in any one of three orthogonal axes, such as pitch (look up/down), yaw (rotate), or roll (tilt).

The ranging sensor can be one or more sensors, and each sensor can have one or more detectors and one or more groups of detectors in different zones. A multiple zone detector generates a distance map or array of data. Furthermore, in some embodiments, the ranging sensor data can be combined with data from a gyroscope/accelerometer/inertial measurement unit (IMU) coupled to the wearable device to provide a blended solution for head movement.

The wearable device includes an input/output device such as a display screen or audio speakers. A display can display virtual reality (VR) or augmented reality (AR) content, with the head position controlling the content being displayed. For example, the user rotating their head may cause the camera perspective to rotate a corresponding amount in a VR game. Similarly, a multichannel audio signal may change the balance between channels at an audio speaker in response to a change in head position. These embodiments implementing a ranging sensor into a wearable device may provide increased fidelity of detecting smaller or slower movements than current systems.

FIG. 1 is a functional block diagram of a head movement measurement control system 100, according to one embodiment of the present disclosure. The head movement measurement control system 100 includes a wearable device 102, which can include a VR or AR display (referred to herein as a VR/AR wearable device, although the wearable device may be a device without a display, such as headphones) and a time-of-flight (TOF) ranging sensor 104 positioned at a side of the VR/AR wearable device 102. The VR/AR wearable device 102 may be a device that is intended to be worn on the head of a user and that provides a virtual reality or augmented reality depiction to the user, depending, in part, on relative movements of the user's head with respect to the user's shoulder. As discussed above, a typical VR/AR wearable device 102 includes a gyroscope that detects movement of the user's head in three dimensions.

In operation, the TOF ranging sensor 104 transmits optical pulses into a field of view FOV that includes the user's shoulder 106 and detects return optical pulses in the field of view that are reflected back by the shoulder 106. The TOF ranging sensor 104 detects a distance $D_{TOF}$ between the sensor and the shoulder 106 based on a time of flight of the optical pulse signals, and generates a range estimation signal RE indicating the detected distance. Processing circuitry 108 receives the range estimation signal RE and then determines the movement of the head with respect to the shoulder 106 based on the range estimation signal RE and the 3-D detection provided by the gyroscope in the VR/AR wearable device 102. The processing circuitry 108 thereafter utilizes the determined movement to change the VR/AR depiction presented to the user by the VR/AR wearable device 102.

Figure 2:
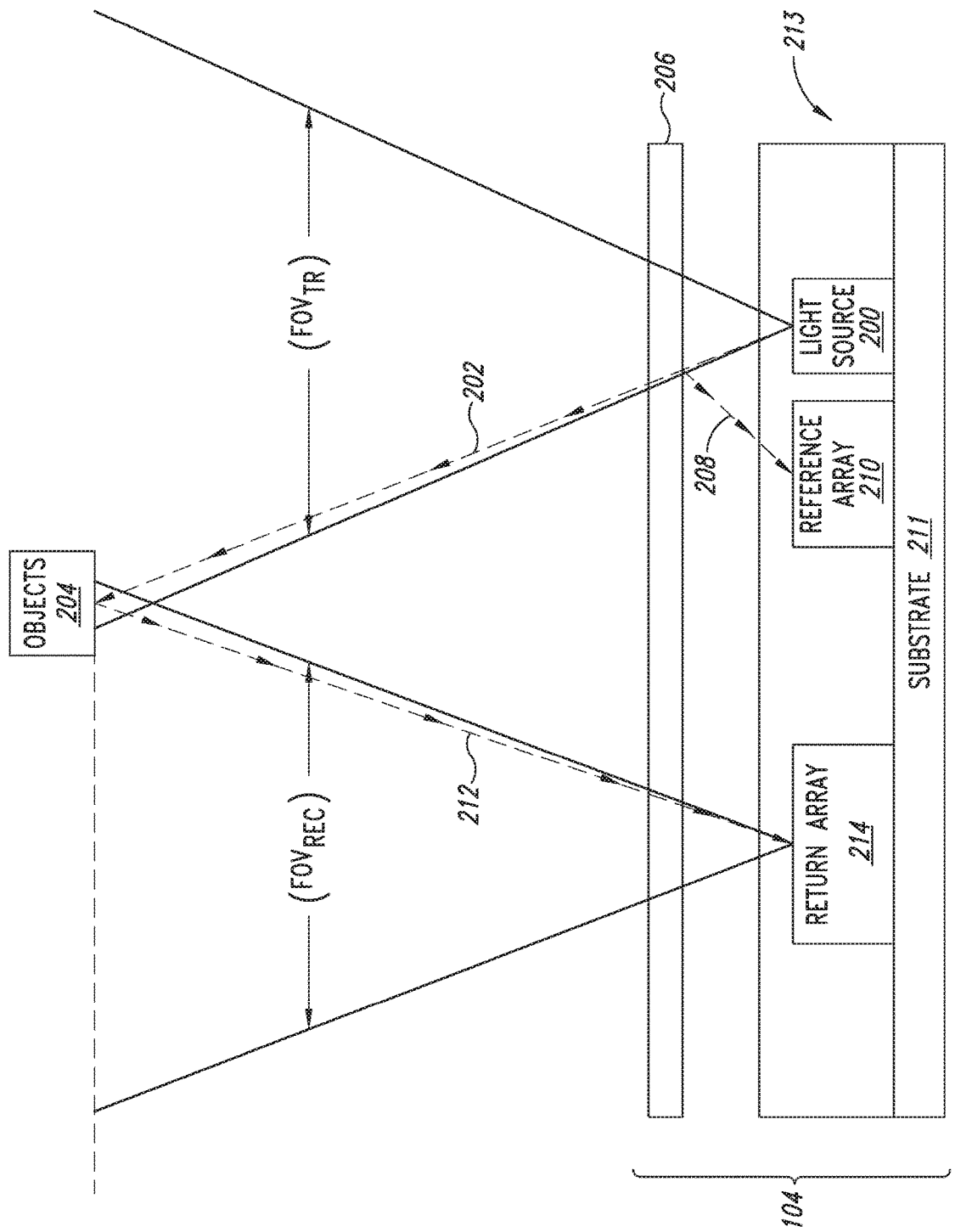
FIG. 2 is a functional diagram illustrating components and operation of the TOF ranging sensor of FIG. 1.

Before describing additional embodiments of the head movement measurement control system 100 of FIG. 1, the structure and operation of embodiments of the TOF ranging sensor 104 will first be described with reference to FIGS. 2-9. FIG. 2 is a functional diagram illustrating components and operation of the TOF ranging sensor 104 of FIG. 1. The TOF ranging sensor 104 may be a single chip that includes a light source 200 and return and reference arrays of photodiodes 214, 210. Alternatively, these components may be incorporated within other circuitry or chips within an electronic device. The light source 200 and the return and reference arrays 214, 210 are formed on a substrate 211. In one embodiment, all the components of the TOF ranging sensor 104 are contained within the same chip or package 213, with all components except for the light source 200 being formed in the same integrated circuit within the package 213 in one embodiment.

The light source 200 transmits optical pulse signals having a transmission field of view FOV to irradiate objects within the field of view. A transmitted optical pulse signal 202 is illustrated in FIG. 2 as a dashed line and irradiates objects 204, such as the user's shoulder, within the transmission field of view FOV of the light source 200. In addition, a reflected portion 208 of the transmitted optical pulse signal 202 reflects off an integrated panel, which may be within a package 213 or may be on a cover 206 of the VR/AR wearable device 102. The reflected portion 208 of the transmitted pulse is illustrated as reflecting off the cover 206; however, it may be reflected internally within the package 213.

The cover 206 may be glass or may be metal or another material that forms a housing of the electronic device. The housing will include openings to allow the transmitted and return signals to be transmitted and received through the cover if not a transparent or semi-transparent material.

The reference array 210 of light sensors detects this reflected portion 208 to thereby sense transmission of the optical pulse signal 208. A portion of the transmitted optical pulse signal 202 reflects off objects 204 within the transmission field of view $FOV_{TR}$ as return optical pulse signals 212 that propagate back to the TOF ranging sensor 104. The TOF ranging sensor 104 includes a return array 214 of light sensors having a receiving field of view $FOV_{REC}$ that detects the return optical pulse signals 212. The field of view FOV of FIG. 1 includes the transmitting and receiving fields of view $FOV_{TR}$ and $FOV_{REC}$. The TOF ranging sensor 104 then determines respective distances $D_{TOF}$ between the TOF ranging sensor and the objects 204 based upon the time between the reference array 210 sensing transmission of the optical pulse signal 202 and the return array 214 sensing the return optical pulse signal 212. The TOF ranging sensor 104 also generates a signal amplitude SA (power) for each of the detected objects 204, as will be described in more detail with reference to FIG. 3.

Figure 3:
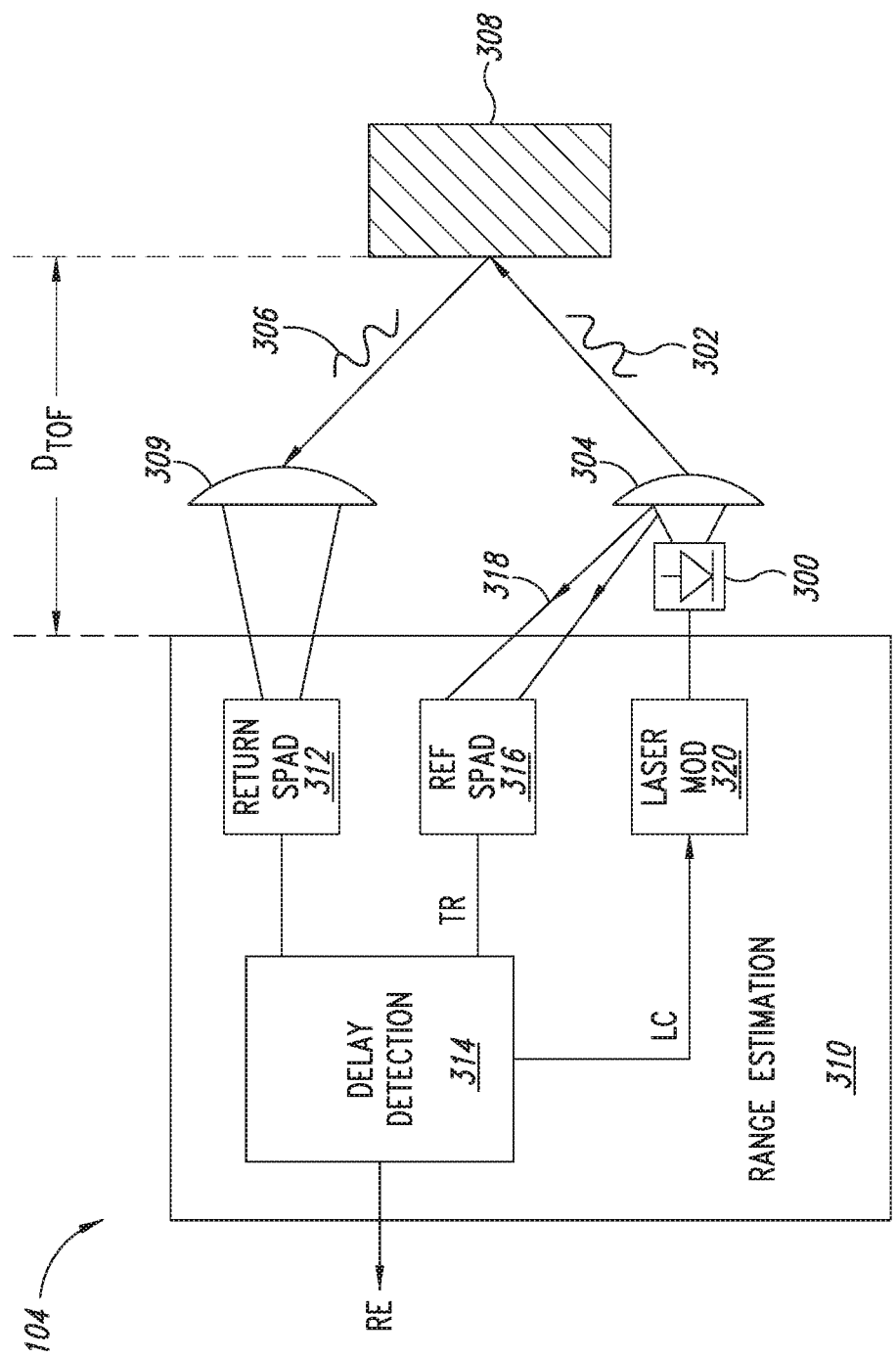
FIG. 3 is a more detailed functional block diagram of the TOF ranging sensor of FIGS. 1 and 2.

FIG. 3 is a more detailed functional block diagram of the TOF ranging sensor 104 of FIGS. 1 and 2, according to one embodiment of the present disclosure. In the embodiment of FIG. 3, the TOF ranging sensor 104 includes a light source 300, which is, for example, a laser diode such as a vertical-cavity surface-emitting laser (VCSEL) for generating the transmitted optical pulse signal designated as 302 in FIG. 3. The transmitted optical pulse signal 302 is transmitted in the transmission field of view $FOV_{TR}$ of the light source 300 as discussed above with reference to FIG. 2. In the embodiment of FIG. 3, the transmitted optical pulse signal 302 is transmitted through a projection lens 304 to focus the transmitted optical pulse signals 302 so as to provide the desired field of view $FOV_{TR}$. The projection lens 304 can be used to control the transmitted field of view $FOV_{TR}$ of the sensor 104 and is an optional component, with some embodiments of the sensor not including the projection lens.

The reflected or return optical pulse signal is designated as 306 in FIG. 3 and corresponds to a portion of the transmitted optical pulse signal 302 that is reflected off objects within the field of view $FOV_{TR}$. One such object 308 is shown in FIG. 3. The return optical pulse signal 306 propagates back to the TOF ranging sensor 104 and is received through a return lens 309 that provides the desired return or receiving field of view $FOV_{REC}$ for the sensor 104, as described above with reference to FIG. 2. The return lens 309 in this way is used to control the field of view $FOV_{REC}$ of the sensor 104. The return lens 309 directs the return optical pulse signal 306 to range estimation circuitry 310 for generating the imaging distance $D_{TOF}$ and signal amplitude SA for each object 308. The return lens 309 is an optional component and thus some embodiments of the TOF ranging sensor 104 do not include the return lens.

In the embodiment of FIG. 3, the range estimation circuitry 310 includes a return single-photon avalanche diode (SPAD) array 312, which receives the returned optical pulse signal 306 via the lens 309. The SPAD array 312 corresponds to the return array 214 of FIG. 2 and typically includes a large number of SPAD cells (not shown), each cell including a SPAD for sensing a photon of the return optical pulse signal 306. In some embodiments of the TOF ranging sensor 104, the lens 309 directs reflected optical pulse signals 306 from separate spatial zones within the field of view $FOV_{REC}$ of the sensor to certain groups of SPAD cells or zones of SPAD cells in the return SPAD array 312, as will be described in more detail below.

Each SPAD cell in the return SPAD array 312 provides an output pulse or SPAD event when a photon in the form of the return optical pulse signal 306 is detected by that cell in the return SPAD array. A delay detection and processing circuit 314 in the range estimation circuitry 310 determines a delay time between transmission of the transmitted optical pulse signal 302 as sensed by a reference SPAD array 316 and a SPAD event detected by the return SPAD array 312. The reference SPAD array 316 is discussed in more detail below. The SPAD event detected by the return SPAD array 312 corresponds to receipt of the return optical pulse signal 306 at the return SPAD array. In this way, by detecting these SPAD events, the delay detection and processing circuit 314 estimates an arrival time of the return optical pulse signal 306. The delay detection and processing circuit 314 then determines the time of flight TOF based upon the difference between the transmission time of the transmitted optical pulse signal 302 as sensed by the reference SPAD array 316 and the arrival time of the return optical pulse signal 306 as sensed by the SPAD array 312. From the determined time of flight TOF, the delay detection and processing circuit 314 generates the range estimation signal RE (FIG. 1) indicating the detected distance $D_{TOF}$ between the objects 308 and the TOF ranging sensor 104.

The reference SPAD array 316 senses the transmission of the transmitted optical pulse signal 302 generated by the light source 300 and generates a transmission signal TR indicating detection of transmission of the transmitted optical pulse signal. The reference SPAD array 316 receives an internal reflection 318 from the lens 304 of a portion of the transmitted optical pulse signal 302 upon transmission of the transmitted optical pulse signal from the light source 300, as discussed for the reference array 210 of FIG. 2. The lenses 304 and 309 in the embodiment of FIG. 3 may be considered to be part of the glass cover 206 or may be internal to the package 213 of FIG. 2. The reference SPAD array 316 effectively receives the internal reflection 318 of the transmitted optical pulse signal 302 at the same time the transmitted optical pulse signal is transmitted. In response to this received internal reflection 318, the reference SPAD array 316 generates a corresponding SPAD event and in response thereto generates the transmission signal TR indicating transmission of the transmitted optical pulse signal 302.

The delay detection and processing circuit 314 includes suitable circuitry, such as time-to-digital converters or time-to-analog converters, to determine the time of flight TOF between the transmission of the transmitted optical pulse signal 302 and receipt of the reflected or return optical pulse signal 306. The delay detection and processing circuit 314 then utilizes this determined time of flight TOF to determine the distance $D_{TOF}$ between the hand 308 and the TOF ranging sensor 104. The range estimation circuitry 310 further includes a laser modulation circuit 320 that drives the light source 300. The delay detection and processing circuit 314 generates a laser control signal LC that is applied to the laser modulation circuit 320 to control activation of the laser 300 and thereby control transmission of the transmitted optical pulse signal 302. The range estimation circuitry 310 also determines the signal amplitude SA based upon the SPAD events detected by the return SPAD array 312. The signal amplitude SA is based on the number of photons of the return optical pulse signal 306 received by the return SPAD array 312. The closer the object 308 is to the TOF ranging sensor 104 the greater the sensed signal amplitude SA, and, conversely, the farther away the object the smaller the sensed signal amplitude SA.

Figure 4A:
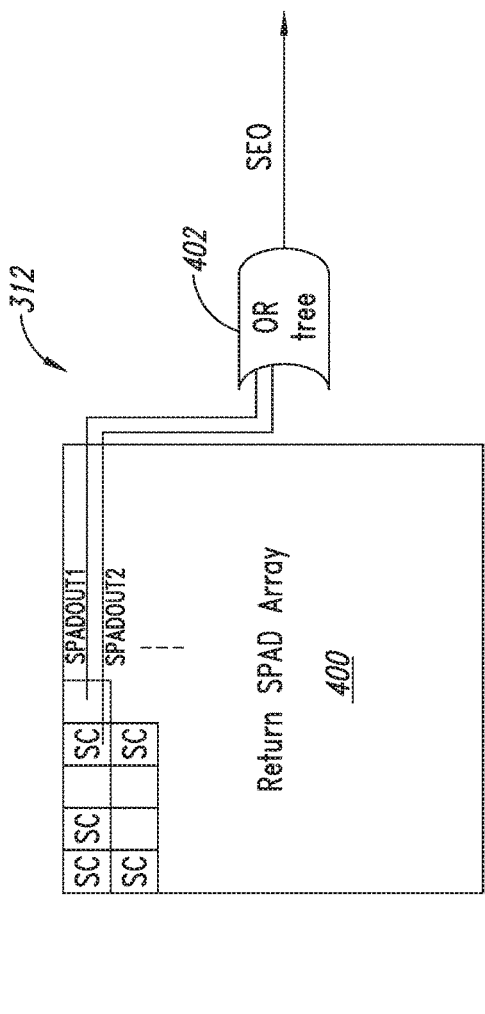
FIG. 4A is a functional diagram of a single zone embodiment of the return SPAD array of FIG. 3.

FIG. 4A is a functional diagram of a single zone embodiment of the return SPAD array 312 of FIG. 3. In this embodiment, the return SPAD array 312 includes a SPAD array 400 including a plurality of SPAD cells SC, some of which are illustrated and labeled in the upper left portion of the SPAD array. Each of these SPAD cells SC has an output, with two outputs labeled SPADOUT1, SPADOUT2 shown for two SPAD cells by way of example in the figure. The output of each SPAD cell SC is coupled to a corresponding input of an OR tree circuit 402. In operation, when any of the SPAD cells SC receives a photon from the reflected optical pulse signal 306, the SPAD cell provides an active pulse on its output. Thus, for example, if the SPAD cell SC having the output designated SPADOUT2 in the figure receives a photon from the reflected optical pulse signal 306, then that SPAD cell will pulse the output SPADOUT2 active. In response to the active pulse on the SPADOUT2, the OR tree circuit 402 will provide an active SPAD event output signal SEO on its output. Thus, whenever any of the SPAD cells SC in the return SPAD array 400 detects a photon, the OR tree circuit 402 provides an active SEO signal on its output. In the single zone embodiment of FIG. 4A, the TOF ranging sensor 104 may not include the lens 309 and the return SPAD array 312 corresponds to the return SPAD array 400 and detects photons from reflected optical pulse signals 306 within the single field of view $FOV_{REC}$ (FIG. 2) of the sensor.

Figure 4B:
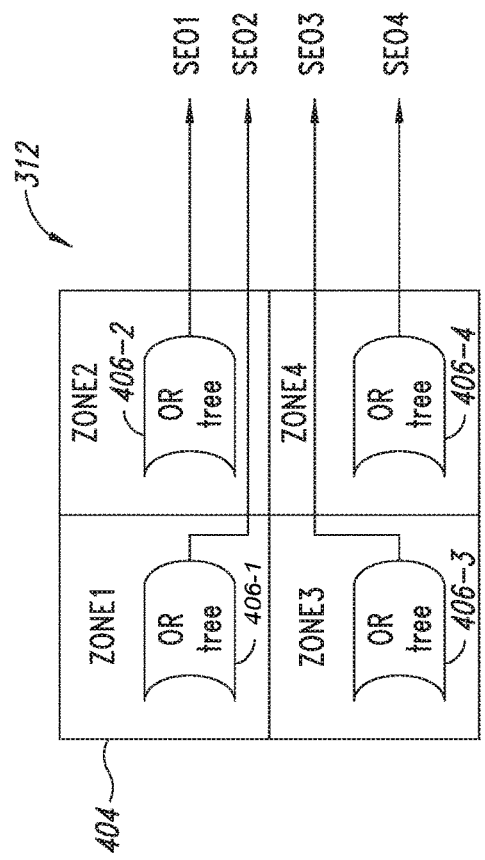
FIG. 4B is a functional diagram of a multiple zone embodiment of the return SPAD array of FIG. 3.

FIG. 4B is a functional diagram of a multiple zone embodiment of the return SPAD array 312 FIG. 3. In this embodiment, the return SPAD array 312 includes a return SPAD array 404 having four array zones ZONE1-ZONE4, each array zone including a plurality of SPAD cells. Four zones ZONE1-ZONE4 are shown by way of example and the SPAD array 404 may include more or fewer zones. A zone in the SPAD array 404 is a group or portion of the SPAD cells SC contained in the entire SPAD array. The SPAD cells SC in each zone ZONE1-ZONE4 have their output coupled to a corresponding OR tree circuit 406-1 to 406-4. The SPAD cells SC and outputs of these cells coupled to the corresponding OR tree circuit 406-1 to 406-4 are not shown in FIG. 4B to simplify the figure.

In this embodiment, each of zones ZONE1-ZONE4 of the return SPAD array 404 effectively has a smaller subfield of view corresponding to a portion of the overall field of view $FOV_{REC}$ (FIG. 2). The return lens 309 of FIG. 3 directs return optical pulse signals 306 from the corresponding spatial zones or subfields of view within the overall field of view $FOV_{REC}$ to corresponding zones ZONE1-ZONE4 of the return SPAD array 404. In operation, when any of the SPAD cells SC in a given zone ZONE1-ZONE4 receives a photon from the reflected optical pulse signal 306, the SPAD cell provides an active pulse on its output that is supplied to the corresponding OR tree circuit 406-1 to 406-4. Thus, for example, when one of the SPAD cells SC in the zone ZONE1 detects a photon that SPAD cell provides and active pulse on its output and the OR tree circuit 406-1, in turn, provides an active SPAD event output signal SEO1 on its output. In this way, each of the zones ZONE1-ZONE4 operates independently to detect SPAD events (i.e., receive photons from reflected optical pulse signals 306 in FIG. 3).

FIGS. 5A and 5B are graphs illustrating operation of the TOF ranging sensor 104 of FIG. 2 in detecting multiple objects within the field of view FOV of the TOF ranging sensor 104 of FIGS. 2 and 3. The graphs of FIGS. 5A and 5B are signal diagrams showing a number of counts along a vertical axis and time bins along a horizontal axis. The number of counts indicates a number of SPAD events that have been detected in each bin, as will be described in more detail below. These figures illustrate operation of a histogram based ranging technique implemented by the TOF ranging sensor 104 of FIGS. 1-3 according to an embodiment of the present disclosure. This histogram based ranging technique allows the TOF ranging sensor 104 to sense or detect multiple objects within the field of view FOV of the TOF ranging sensor.

Figure 6:
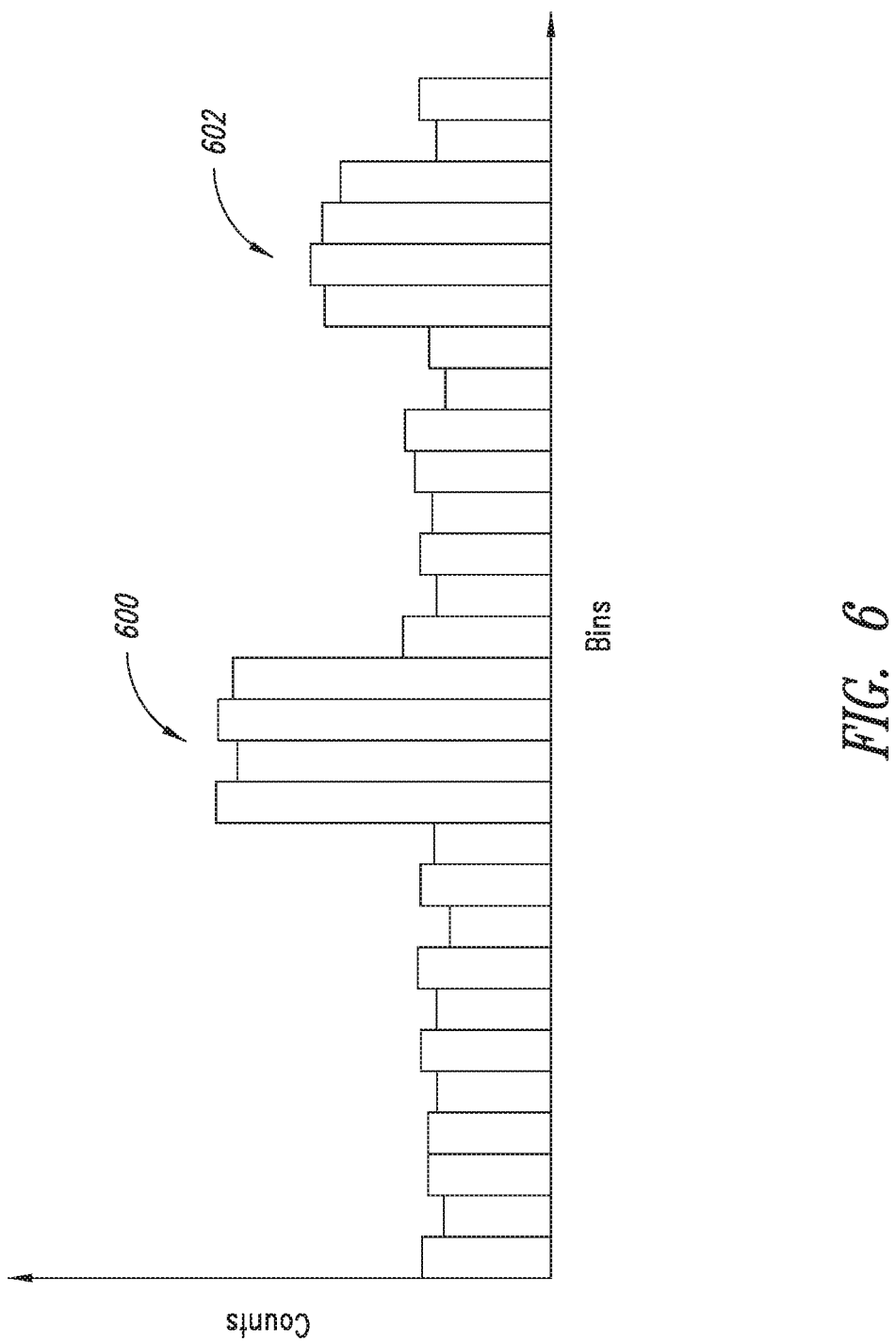
FIG. 6 illustrates a histogram generated by TOF ranging sensor over multiple cycles.

This histogram based ranging technique is now described in more detail with reference to FIGS. 3, 4A, 4B, 5A and 5B. In this technique, more than one SPAD event is detected each cycle of operation, where the transmitted optical pulse signal 302 is transmitted each cycle. SPAD events are detected by the return SPAD array 312 (i.e., return SPAD array 400 or 404 of FIGS. 4A, 4B) and the reference SPAD array 316, where a SPAD event is an output pulse provided by the return SPAD array indicating detection of a photon. Thus, an output pulse from the OR tree circuit 402 of FIG. 4A or one of the OR tree circuits 406-1 to 406-4 of FIG. 4B. Each cell in the SPAD arrays 312 and 316 will provide an output pulse or SPAD event when a photon is received in the form of the return optical pulse signal 306 for return SPAD array 312 and internal reflection 318 of the transmitted optical pulse signal 302 for the reference SPAD array 316. By monitoring these SPAD events an arrival time of the optical signal 306, 318 that generated the pulse can be determined. Each detected SPAD event during each cycle is allocated to a particular bin, where a bin is a time period in which the SPAD event was detected. Thus, each cycle is divided into a plurality of bins and a SPAD event detected or not for each bin during each cycle. Detected SPAD events are summed for each bin over multiple cycles to thereby form a histogram in time as shown in FIG. 6 for the received or detected SPAD events. The delay detection and processing circuit 314 of FIG. 3 or other control circuitry in the TOF ranging sensor 104 implements this histogram-based technique in one embodiment of the sensor.

FIGS. 5A and 5B illustrate this concept over a cycle. Multiple cells in each of the SPAD arrays 312 and 316 may detect SPAD events in each bin, with the count of each bin indicating the number of such SPAD events detected in each bin over a cycle. FIG. 5B illustrates this concept for the internal reflection 318 of the transmitted optical pulse signal 302 as detected by the reference SPAD array 316. The sensed counts (i.e., detected number of SPAD events) for each of the bins shows a peak 500 at about bin 2 with this peak being indicative of the transmitted optical pulse signal 302 being transmitted. FIG. 5A illustrates this concept for the reflected or return optical pulse signal 306, with there being two peaks 502 and 504 at approximately bins 3 and 9. These two peaks 502 and 504 (i.e., detected number of SPAD events) indicate the occurrence of a relatively large number of SPAD events in the bins 3 and 9, which indicates reflected optical pulse signals 306 reflecting off a first object causing the peak at bin 3 and reflected optical pulse signals reflecting off a second object at a greater distance than the first object causing the peak at bin 9. A valley 506 formed by a lower number of counts between the two peaks 502 and 504 indicates no additional detected objects between the first and second objects. Thus, the TOF ranging sensor 104 is detecting two objects within the FOV of the sensor in the example of FIGS. 5A and 5B. The two peaks 502 and 504 in FIG. 5A are shifted to the right relative to the peak 500 of FIG. 5B due to the time-of-flight of the transmitted optical pulse signal 302 in propagating from the TOF ranging sensor 104 to the two objects within the FOV but at different distances from the TOF ranging sensor.

FIG. 6 illustrates a histogram generated by TOF ranging sensor 104 over multiple cycles. The height of the rectangles for each of the bins along the horizontal axis represents the count indicating the number of SPAD events that have been detected for that particular bin over multiple cycles of the TOF ranging sensor 104. As seen in the histogram of FIG. 6, two peaks 600 and 602 are again present, corresponding to the two peaks 502 and 504 in the single cycle illustrated in FIG. 5A. From the histogram of FIG. 6, either the TOF ranging sensor 104 determines a distance $D_{TOF}$ to each of the first and second objects in the FOV of the TOF ranging sensor. In addition, the TOF ranging sensor 104 also generates the signal amplitude SA for each of the objects based upon these counts, namely the number of photons or SPAD events generated by the return SPAD array 312 in response to the return optical pulse signal 306.

Figure 7:
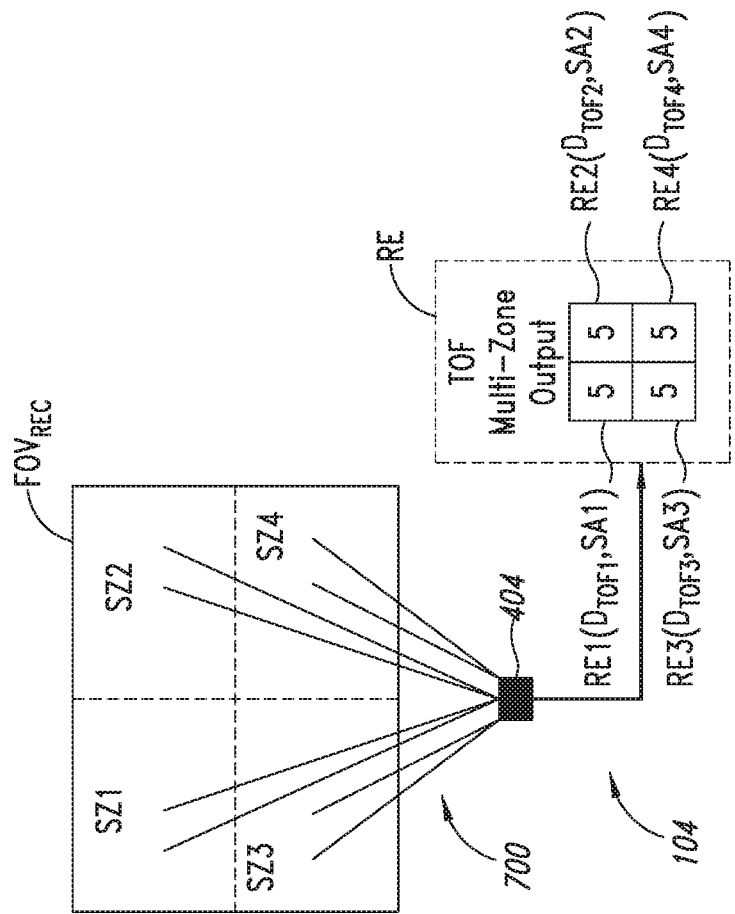
FIG. 7 is a diagram illustrating multiple spatial zones within the receiving field of view where the TOF ranging sensor is a multiple zone sensor including the return SPAD array of FIG. 4B.

FIG. 7 is a diagram illustrating multiple spatial zones within the receiving field of view $FOV_{REC}$ where the TOF ranging sensor 104 is a multiple zone sensor including the return SPAD array 404 of FIG. 4B. In this embodiment, the receiving field of view $FOV_{REC}$ includes four spatial zones SZ1-SZ4 as shown. Thus, the four spatial zones SZ1-SZ4 collectively form the receiving field of view $FOV_{REC}$ of the TOF ranging sensor 104. The transmitted optical pulse signal 302 (FIG. 3) illuminates these four spatial zones SZ1-SZ4 within the receiving field of view $FOV_{REC}$. The number of spatial zones SZ corresponds to the number of array zones ZONE1-ZONE4 in the return SPAD array 404 of FIG. 4B. Where the return SPAD array 404 includes a different number of array zones ZONE1-ZONE4 or a different arrangement of the array zones within the return SPAD array, then the number and arrangement of the corresponding spatial zones SZ within the overall field of view $FOV_{REC}$ will likewise vary. In such a multiple zone TOF ranging sensor 104 as functionally illustrated in FIG. 7, the return lens 309 (FIG. 3) is configured to route return optical pulse signals 306 from each of the spatial zones SZ within the overall field of view $FOV_{REC}$ to a corresponding array zone ZONE1-ZONE4 of the return SPAD array 404 of FIG. 4B. This is represented in the figure through the pairs of lines 700 shown extending from the return SPAD array 404 to each of the spatial zones SZ1-SZ4.

Each of the array zones ZONE1-ZONE4 outputs respective SPAD event output signals SEO1-SEO4 as previously described with reference to FIG. 4B, and the TOF ranging sensor 104 accordingly calculates four different imaging distances $D_{TOF1}$-$D_{TOF4}$, one for each of the spatial zones SZ1-SZ4. Thus, in this embodiment the range estimation signal RE generated by the TOF ranging sensor 104 includes four different values for the four different detected imaging distances $D_{TOF1}$-$D_{TOF4}$. Each of these detected imaging distances $D_{TOF1}$-$D_{TOF4}$ is shown as being part of the generated range estimation signal RE to have a value 5. This would indicate objects in each of the spatial zones SZ1-SZ4 are the same distance away, or indicate that there is one object covering all the spatial zones. The value 5 was arbitrarily selected merely to represent the value of each of the detected imaging distances $D_{TOF1}$-$D_{TOF4}$ and to illustrate that in the example of FIG. 7 each of these detected imaging distances has the same value. As seen in FIG. 7, the TOF ranging sensor 104 also outputs the signal amplitude SA signal for each of the spatial zones SZ and corresponding array zones ZONE. Thus, for the spatial zone SZ1 the TOF ranging sensor 104 generates the range estimation signal RE1 including the sensed distance $D_{TOF1}$ and signal amplitude SA1 generated based on SPAD events detected by array zone ZONE1. The signals RE2-RE4 for spatial zones SZ2-SZ4 and array zones ZONE2-ZONE4 are also shown. The signal amplitude SA generated by the TOF ranging sensor 104 in the embodiments of FIGS. 4A and 4B of the return SPAD array 400, 404 contained in the sensor may also be utilized by the processing circuitry 108 in controlling the operation of the head movement detection system, as will be described in more detail below.

While in the present description embodiments are described including a ranging device in the form of a SPAD array, the principles of the circuits and methods described herein for calculating a distance to an object could be applied to arrays formed of other types of photon detection devices or any other ranging sensor.

Figure 8:
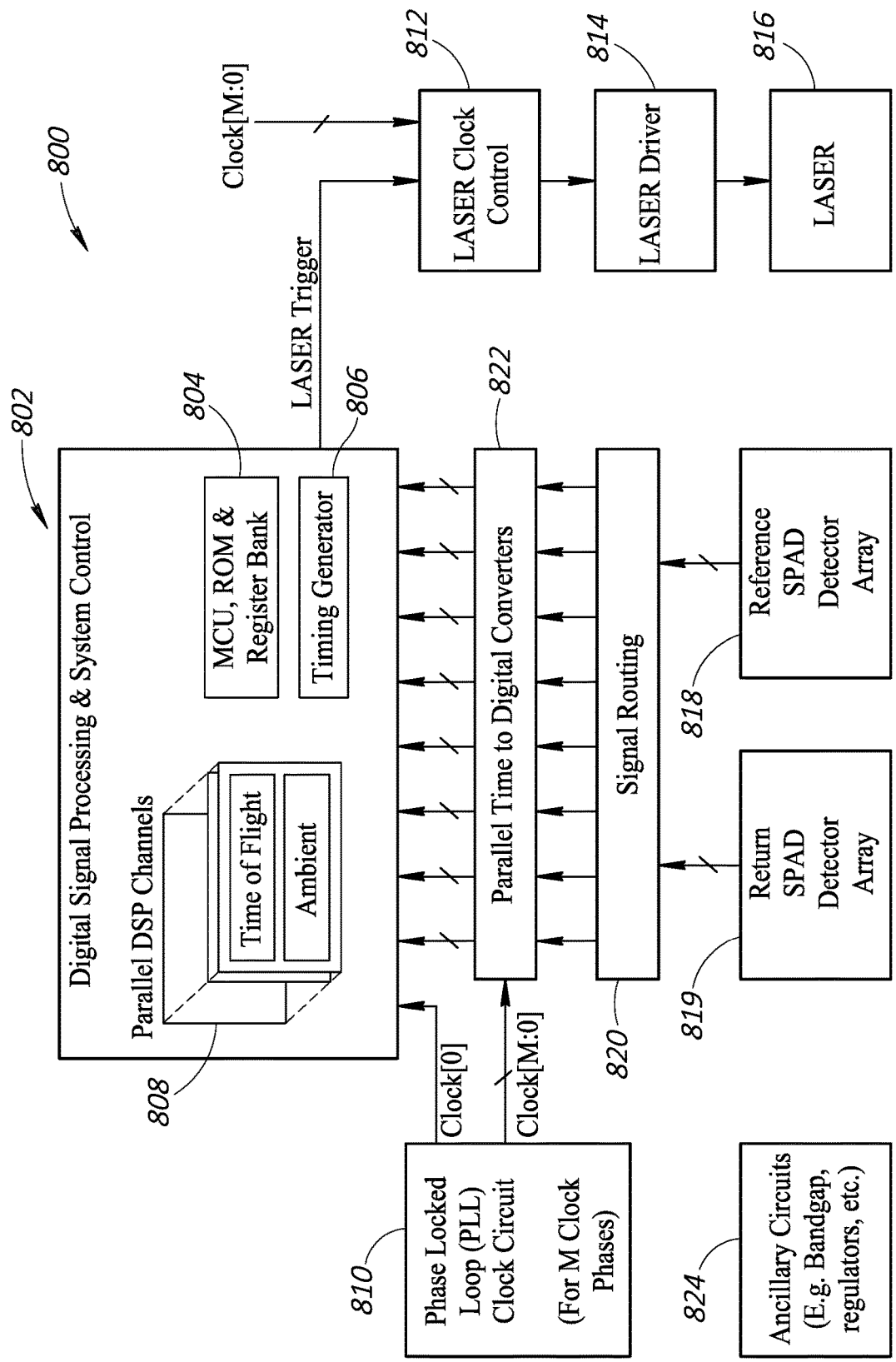
FIG. 8 is a detailed block diagram of components of the ranging sensor, according to one embodiment of the present disclosure.

FIG. 8 is a detailed block diagram of components of the ranging sensor, according to one embodiment of the present disclosure. To produce the ranging data, the ranging sensor 800 uses time-of-flight ranging, in which a signal is broadcast from the ranging sensor 800, and the time it takes for a return signal to be received at the ranging sensor 800 is used to calculate distance between the ranging sensor 800 and an obstruction. The ranging sensor 800 includes a digital signal processing (DSP) and system control unit 802. The control unit 802 is a processing hub for the signals of the ranging sensor 800, with a microcontroller unit (MCU), read only memory (ROM), and register bank 804 for processing the signals. The control unit 802 further includes a timing generator 806 for generating a laser trigger signal. The control unit 802 also includes parallel DSP channels 808 for processing ranging signals. The ranging sensor 800 includes a phase locked loop (PLL) clock circuit 810 that produces a clock signal CLOCK that keeps inputs and outputs phase synchronized.

The ranging sensor 800 includes a laser clock control 812, a laser driver 814, and a laser 816 to produce a ranging signal. The laser clock control 812 receives a laser trigger input from the control unit 802 and a clock input from the PLL clock circuit 810 to determine when to cause the laser 816 to fire. Once the laser clock control 812 is activated, the laser driver 814 applies a driving charge to the 816, such as by acting as an amplifier to the output of the laser clock control 812. Once triggered by the laser driver 814, the laser 816 generates a laser projected from the ranging sensor 800. The projected laser is projected out from the laser 816 and propagates away from the laser 816 until hitting an obstruction. When the projected laser hits the obstruction, it can be reflected back to the ranging sensor 800 as a return signal. The return signal is one of any number of reflections of the projected laser, and is one that is in approximately the opposite direction as the projected laser towards the ranging sensor 800. The projected laser can be an optical signal that is visible or invisible. The projected laser can be output as a pulse, with a time delay between each pulse to provide for the processing of the distance information gathered from the pulse.

The ranging sensor 800 receives reflections of the projected laser at a reference single-photon avalanche diode (SPAD) detector array 818 and a return SPAD detector array 819. The reference and return arrays 818, 819 detect photons in the wavelength of the emissions of the laser 816, such as the return signal. The reference array 818 is positioned to receive a portion of the projected laser before it exits the ranging sensor 800. The return array 819 is positioned to receive the return signal. The reference and return arrays 818, 819 may include a single detector or a plurality of detectors. Furthermore, the reference and return arrays 818, 819 can have different quantity of detectors from each other and may have detectors grouped for the results to be aggregated. The reference and return arrays 818, 819 send power signals to a signal routing 820 that is a bus for each of the reference and return arrays 818, 819. The signal routing 820 transmits the signals to parallel time to digital converters 822 that convert the time domain power signals of the reference and return arrays 818, 819 into digital time domain power signals at intervals set by the PLL clock circuit 810. The converters 822 then transmit the signals to the control unit 802 in which the parallel DSP channels 808 process the digital signals to determine a time difference between receipt of the signals at the reference array 818 and the return array 819. The control unit 802 can then generate a time of flight of the ranging signal to an obstruction, or a relative or absolute distance based on the propagation speed of the projected laser. Ancillary circuits 824 may also be included to aid in the processing by the circuits, such as band gap regulators and power regulators.

Figure 9:
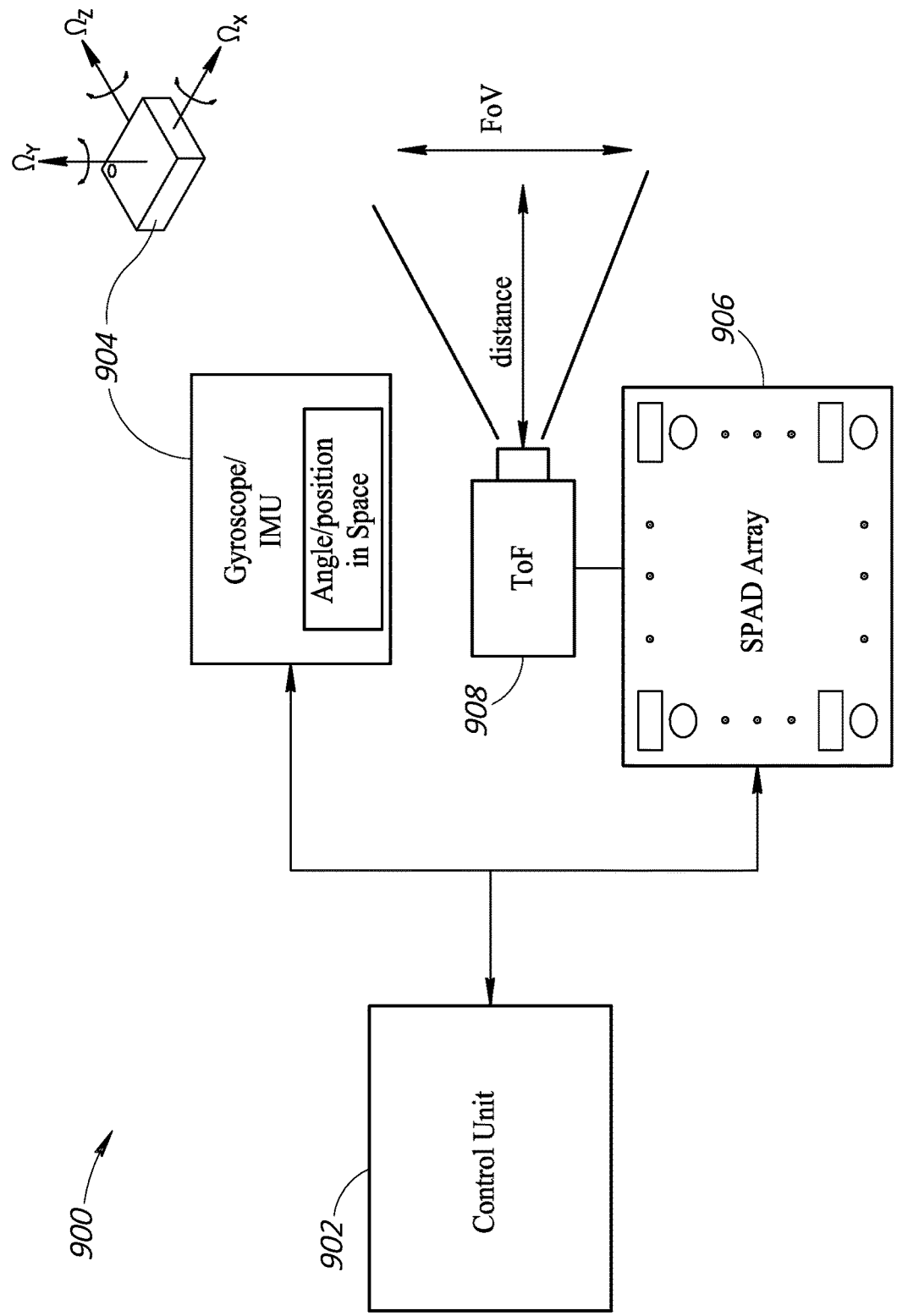
FIG. 9 is a high-level functional block diagram of components of the head movement detection system.

FIG. 9 is a high-level functional block diagram of components of the head movement detection system. The head movement detection system 900 includes a control unit 902. In some embodiments, the control unit 902 is similar to the control unit 802. In other embodiments, the control unit 902 is a separate component that may receive signals from the control unit 802. The control unit 902 is coupled to outputs of a gyroscope/inertial measurement unit (IMU) 904 and SPAD array 906, the SPAD array 906 having being part of a TOF range detector 908. The gyroscope/IMU 904 is shown as a chip having three axes of angular rotation detection $\Omega_x$, $\Omega_y$, and $\Omega_z$, each orthogonal to one another. In other embodiments, other quantities and positions of axes are used such as a single axis or a dual axis.

The SPAD array 906 and TOF range detector 908 can represent the ranging sensor 800 in some embodiments. The TOF range detector 908 detects a distance based on the range between the TOF range detector 908 and an obstruction or object. The TOF range detector 908 also has a field of view FOV.

The head movement detection system 900 can include hardware, firmware, and software to fuse the ranging sensor and the gyroscope/IMU. Specifically, the ranging sensor and the gyroscope/IMU 904 can be combined in a new package, with firmware to analyze the data to generate measurements and to control calibration. The calibration can also be coordinated between the ranging sensor and the gyroscope/IMU with software. Co-calibration may improve detection of range change and angle change, improve initial condition setting and improve ongoing data collection for the gyroscope/IMU. Additionally, new software can be implemented to process the ranging sensor data to make inferences about head movement of the user, such as head rotation and tilting. Both the ranging sensor and the gyroscope/IMU may output turn angles in a three dimensional direction or coordinate for pitch, yaw, and roll. The head movement detection system 900 can blend these output turn angles by giving them weights and combining. The weights may be fixed or dynamic based on any number of variables, such as the present outputs or historical outputs related to specific orientations.

Figure 10:
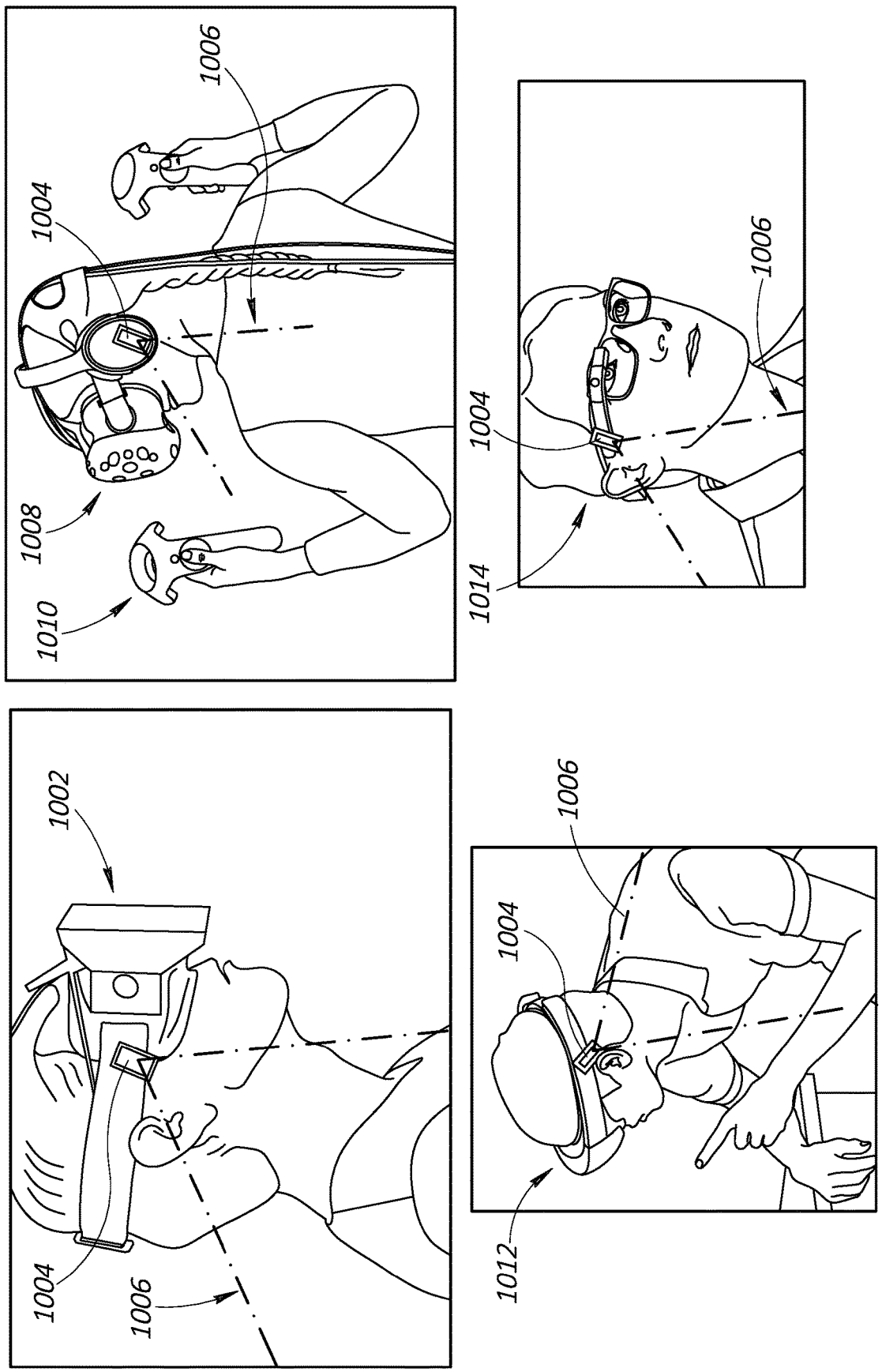
FIG. 10 is a collage of depictions of various wearable devices having the head movement detection system of the present disclosure.

FIG. 10 is a collage of depictions of various wearable devices having the head movement detection system of the present disclosure. A wearable device 1002 is shown as a headset in which a user views a display using goggles with all other visual inputs blocked. The wearable device 1002 has the ability to detect head rotation, such as for example with the use of a ranging sensor 1004 mounted on a supporting structure of the wearable device 1002, the ranging sensor 1004 having a field-of-view 1006 pointed at a shoulder of the user. The user can use the wearable device 1002 to watch a two-dimensional or three-dimensional 360 degree video, in which head rotation of the user causes the images displayed by the wearable device 1002 to change a corresponding amount.

A wearable device 1008 is shown as a headset in which a user views a display using goggles with all other visual inputs blocked and provides inputs using controllers 1010. The wearable device 1008 has the ability to detect head rotation, such as for example with the use of a ranging sensor 1004 mounted on a supporting structure of the wearable device 1008, the ranging sensor 1004 having a field-of-view 1006 pointed at the shoulder of the user. The user can use the wearable device 1008 to play a three-dimensional game or interact with a three dimensional synthesized object in virtual reality (VR), in which head rotation of the user causes the images displayed by the wearable device 1008 to change a corresponding amount.

A wearable device 1012 is shown as a headset in which a user views a display using goggles with some other visual inputs from the environment around a user unobstructed. The wearable device 1012 has the ability to detect head rotation, such as for example with the use of a ranging sensor 1004 mounted on a supporting structure of the wearable device 1012, the ranging sensor 1004 having a field-of-view 1006 pointed at the shoulder of the user. The user can use the wearable device 1012 to play a three-dimensional game or interact with a synthesized object in augmented reality (AR), in which head rotation of the user causes the images displayed by the wearable device 1008 to change a corresponding amount.

A wearable device 1014 is shown as a headset in which a user views a display using goggles with most other visual inputs from the environment around a user unobstructed. The wearable device 1014 has the ability to detect head rotation, such as for example with the use of a ranging sensor 1004 mounted on a supporting structure of the wearable device 1014, the ranging sensor 1004 having a field-of-view 1006 pointed at a shoulder of the user. The user can use the wearable device 1014 to play a three-dimensional game or interact with a synthesized object in AR, in which head rotation of the user causes the images displayed by the wearable device 1014 to change a corresponding amount. These unobstructed goggles can be used for a variety of purposes, interacting with the user's environment, which may include AR.

By monitoring the distance between the ranging sensor 1004 and the user's shoulder and determining the reflectivity of the shoulder in the field of view 1006, the ranging sensor 1004 can determine head rotation of the wearable device. Detecting other parts of the user's body may also be possible. In addition, the ranging sensor 1004 can provide data to a processor or control unit to be combined with data from a gyroscope, as described throughout the present disclosure. In each of the embodiments shown in FIG. 10, a display screen is presented to the user, with the content on the display screen being able to be manipulated based on detected head rotation. In other embodiments, the displayed images are not manipulated with head rotation or movement. And in yet other embodiments, no display screen is provided and other IO devices are coupled to the head movement detection system, such as audio headphones that detect if they have been partially or completely removed for controlling an output level or where changes in head rotation changes the balance of audio channels.

In one embodiment, inferences can be made on head rotation based on the distance values. For example, if the distance increases between the ranging sensor 1004 and the shoulder of the user, an inference can be made that the head is either being tilted away from that shoulder or the head is rotating away from that shoulder. If the distance decreases between the ranging sensor 1004 and the shoulder of the user, an inference can be made that the head is either being tilted toward that shoulder or the head is rotating toward that shoulder. Similar conclusions can be made using reflectivity as the reflectivity will increase inversely with distance, thus an increase in reflectivity will suggest moving the head toward the shoulder and a decrease in reflectivity will suggest moving the head away from the shoulder. It may also be possible to differentiate between different types of movements based on the signal patterns. The ranging data can be combined with ranging data from other ranging sensors or any other sensor, such as a gyroscope/accelerometer/IMU to develop a blended solution, such as by using the ranging sensor to generate a movement vector and using a gyroscope to generate a movement vector, and taking the average of those two vectors. Other blended solutions may be used, such as different weights like 60-70% gyroscope vector and 40-30% ranging vector.

Figure 11A:
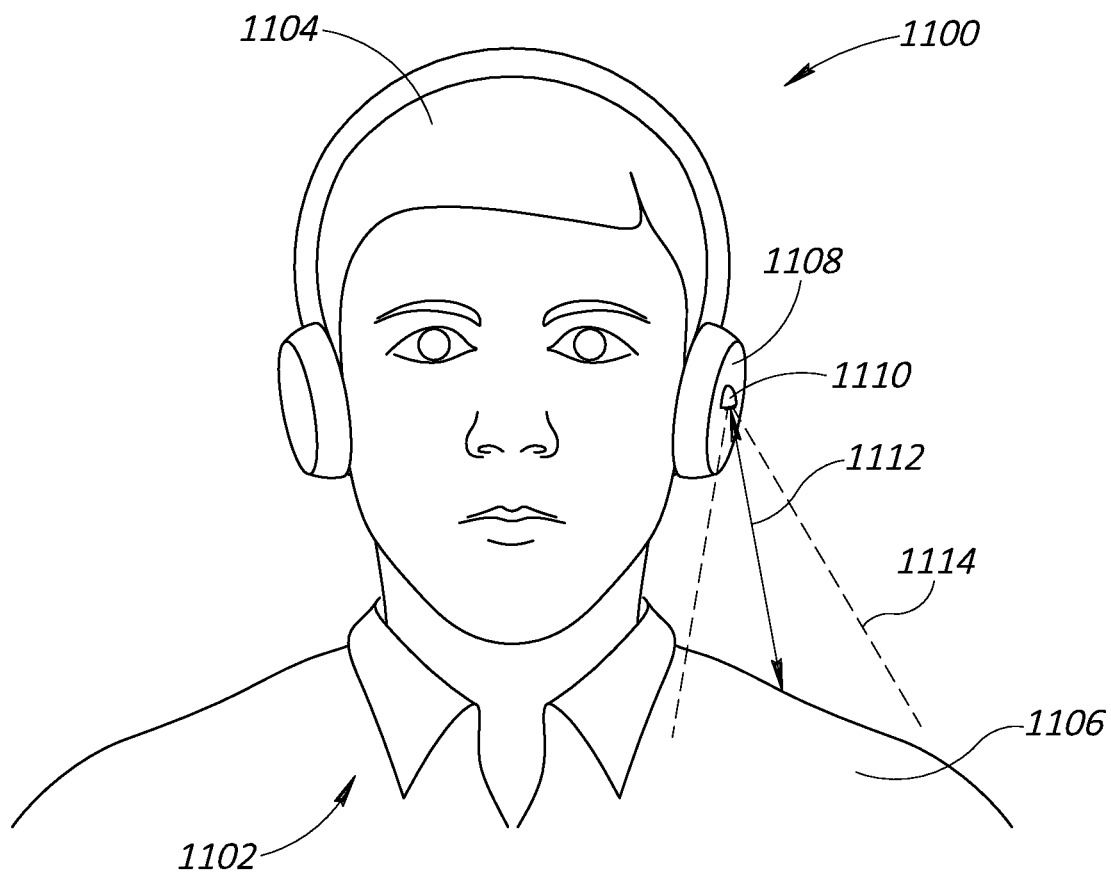
FIGS. 11A-11C are various views of the head movement detection system with a user looking straight ahead and the corresponding view from the ranging sensor.
Figure 11B:
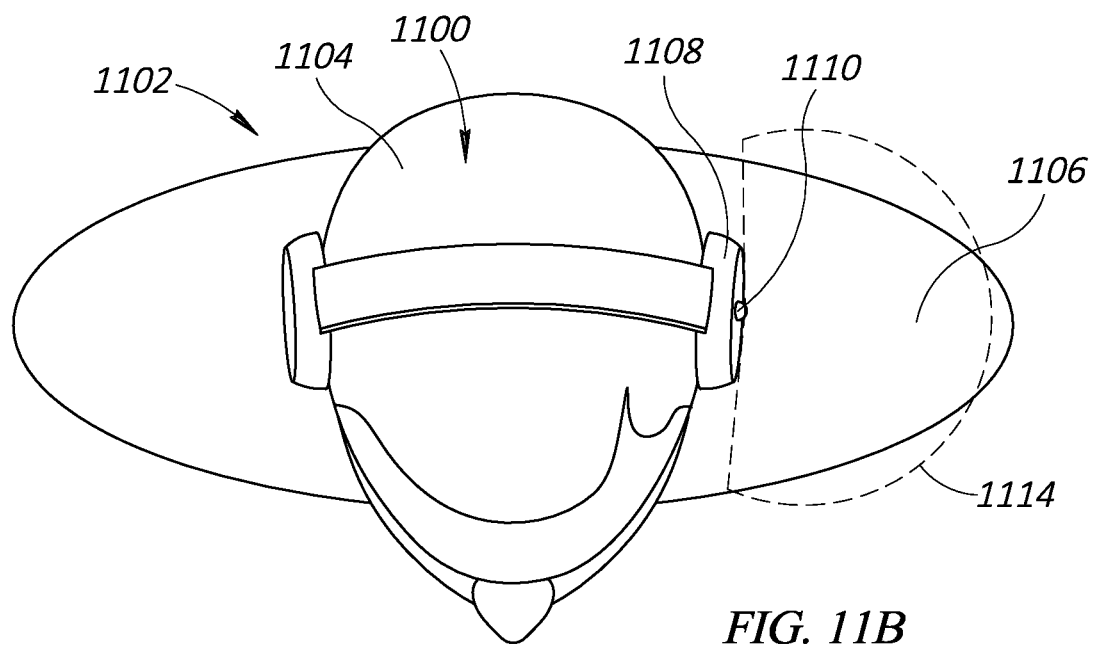
Figure 11C:
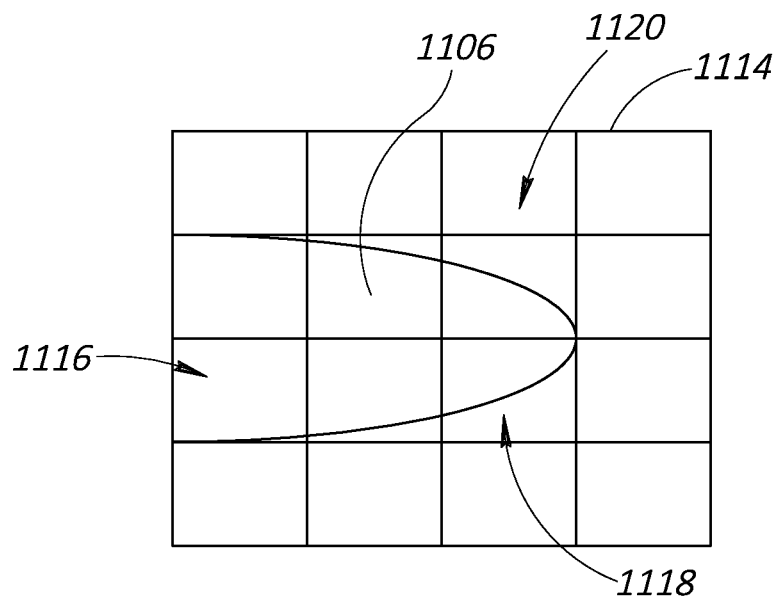

FIGS. 11A-11C are various views of the head movement detection system with a user looking straight ahead and the corresponding view from the ranging sensor. A wearable device 1100 is shown being worn by a user 1102. For ease of understanding, the wearable device 1100 is depicted as being a set of headphones; however, any of the wearable devices may include similar components and functionality.

The user 1102 has a head 1104 that is upright and looking forward in a natural and unstrained position. The user 1102 also has a shoulder 1106 resting in a natural position covered by a shirt. Other clothing can be worn instead of or in addition to the shirt shown. Similarly, other obstructions like bag straps can be monitored. The sensor and system may include calibration features that are either pre-programmed or learned through a calibration process. The calibration features can be used to compare the detected ranging signals, which can return distance and reflectivity information, to identify information about the user's shoulder.

The wearable device includes an earpiece 1108. The earpiece 1108, in this embodiment, is an over-the-ear speaker that is one of a pair of speakers that provide a stereo audio signal each to a different ear of the user 1102. The earpiece 1108 has on its exterior surface a ranging sensor 1110. The ranging sensor 1110 is any one of the ranging sensors described in the present disclosure, such as an optical TOF ranging sensor. The ranging sensor 1110 is shown mounted on an exterior surface of the earpiece 1108, but in other embodiments the ranging sensor may be embedded in the earpiece 1108 or is coupled to any other supporting structure of the wearable device 1100. In this embodiment, the ranging sensor is on an outermost surface of the wearable device, outermost with respect to a surface that faces or touches the user. In other embodiments, the ranging sensor may be on a front surface, such as one that is facing the same direction as the user's face. This front surface is transverse to the side, outermost surface. The position of the ranging sensor on the wearable device dictates the type of calibration information that will be pre-programmed or generated to identify a change in position of the user's head.

The ranging sensor 1110 detects a distance 1112 from the ranging sensor 1110 to the shoulder 1106. Based on an initial calibration, the distance 1112 shown in FIG. 11A reflects a distance corresponding to the head being in an upright, looking forward, natural, and unstrained baseline position. By analyzing the time of flight of the ranging signal, the ranging sensor 1110 can be used to determine a distance from the ranging sensor 1110 on the earpiece 1108 to the shoulder 1106 of the user 1102. For example, using a representative scale of whole integers between 1 and 10, if the shoulder 1106 is at a maximum range from the ranging sensor the distance is 10. If the shoulder 1106 is midway to the ranging sensor 1110 the distance is 5. If the shoulder 1106 is at a minimum range from the ranging sensor the distance is 1. Other representative or real distance values can be generated.

The ranging sensor 1110 also has a field of view 1114 that projects away from the ranging sensor 1110 and grows in cross-sectional area with distance. The ranging sensor 1110 detects objects within the field of view 1114. The field of view 1114 is shown pointing down at a slight angle off of straight down to be positioned centered on the shoulder 1106 when the user 1102 is in the baseline position. In other embodiments the field of view 1114 may be positioned so part or all of the field of view 1114 is off of the shoulder 1106 in the baseline position. The ranging sensor 1110 also detects a reflectivity, or power level, of the ranging signal. By analyzing the reflectivity of the ranging signal, the ranging sensor 1110 can be used to determine a percent of coverage of the field of view 1114 because greater coverage of the field of view 1114 will cause more of the ranging signal to be reflected and less coverage of the field of view 1114 will cause less of the ranging signal to be reflected. For example, using the scale of whole integers between 1 and 10, if the shoulder 1106 covers the entire field of view 1114 the reflectivity is 10. If the shoulder 1106 covers half of the field of view 1114, the reflectivity is 5. If the shoulder 1106 is not in the field of view 1114, the reflectivity is 1. Other representative or real reflectivity values can be generated.

FIG. 11A depicts a front view and FIG. 11B depicts a top down view of the user 1102 wearing the wearable device 1100. FIG. 11C depicts a distance map (grid) of a multiple zone embodiment of the ranging sensor 1110 overlaid over a view from the perspective of the ranging sensor 1110 of the shoulder 1106 from FIGS. 11A, 11B. In some embodiments, the distance map is an array of distance or reflectivity values generated by the multiple zone ranging sensor 1110. For a single zone ranging sensor, the entire field of view 1114 would be one zone of the ranging sensor 1110, but would otherwise operate similar to the description below. The distance map is bound by the field of view 1114 of the ranging sensor 1110, thus only part of the user 1102 visible is the shoulder 1106 in FIG. 11C. Because the user 1102 is in the baseline position, there is a symmetrical view from top to bottom of the distance map. The distance map has a grid representing the different spatial zones. A distance from the ranging sensor to the top of the user's shoulder is smaller than a distance from the ranging sensor to the chest of the user. The system will take periodic measurements and compare a first set of measurements to a second set of measurements, which may be consecutive in time to determine a change in position of the head of the user with respect to the user's shoulder.

Using the scale of whole integers between 1 and 10, in FIG. 11C a first grid box 1116 is almost completely filled by a base of the shoulder 1106 near the head 1104 at a distance associated with the baseline position and thus has a distance value of 4 and a reflectivity value of 10. A second grid box 1118 is a little over half filled by an end of the shoulder 1106 away from the head 1104 at a distance associated with the baseline position and thus has a distance value of 5 and a reflectivity value of 6. The distance value of the second grid box 1118 is higher than the distance value of the first grid box 1116 because the shoulder 1106 slopes down from the base to the end of the shoulder 1106 causing an increase in distance. A third grid box 1120 is vacant and thus has a distance value of 10 and a reflectivity value of 0. In other embodiments a vacant grid box will produce a null result. Only the shoulder 1106 is visible in FIG. 11C; however, other objects may be visible to the ranging sensor 1110 if in the field of view 1114 under other circumstances, such as an arm of the user, an appendage of another user, a shoulder bag, a piece of furniture, or the floor. The head movement detection system 1100 may filter these items out by focusing on the first detected object, or may include these as references in tracking head position of the user 1102.

Figure 12A:
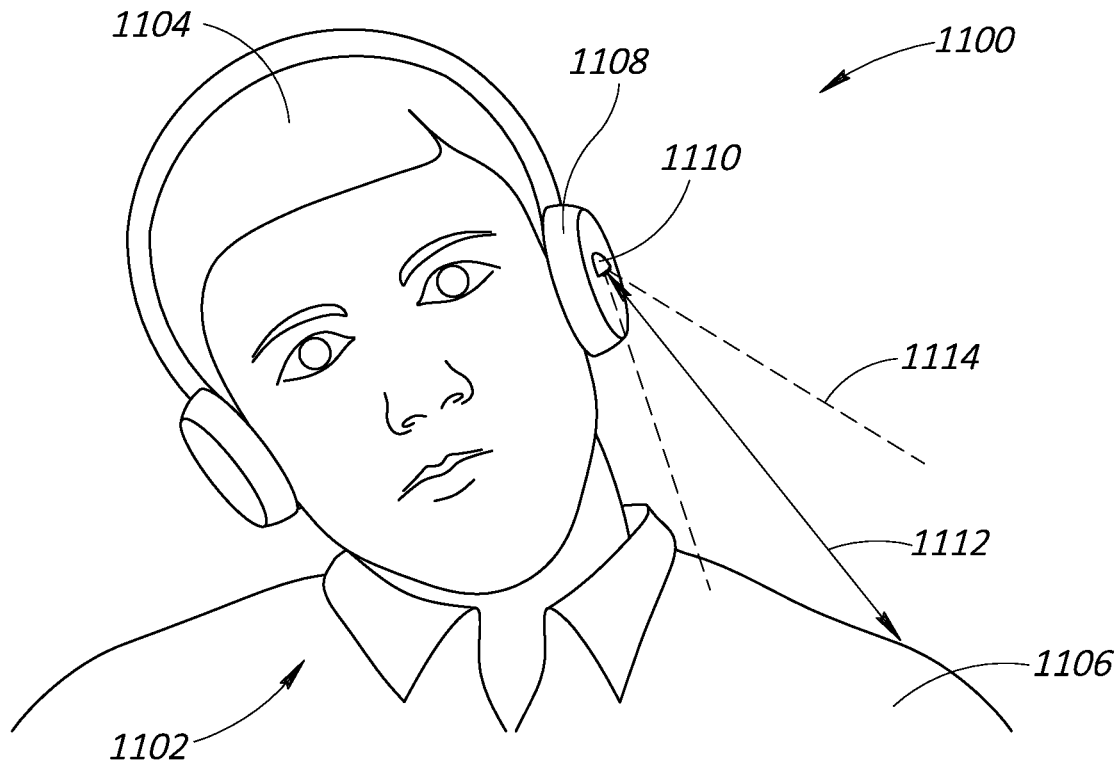
FIGS. 12A-C are various views of the head movement detection system with the user titling their head away from their shoulder and the corresponding view from the ranging sensor.
Figure 12B:
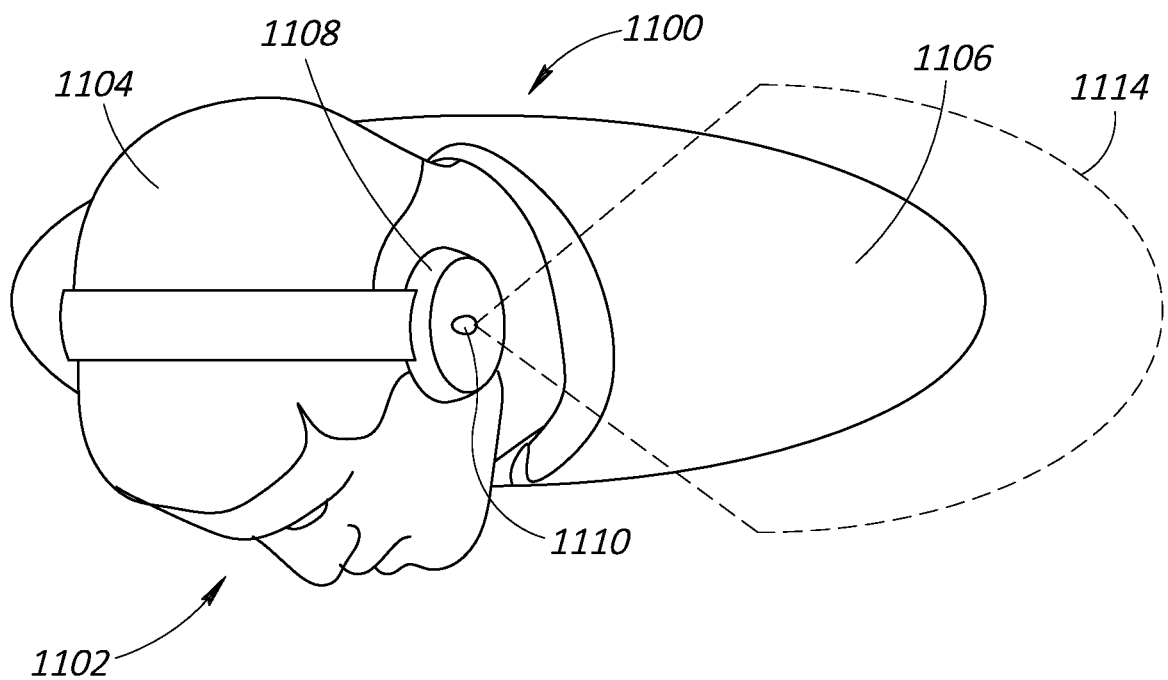
Figure 12C:
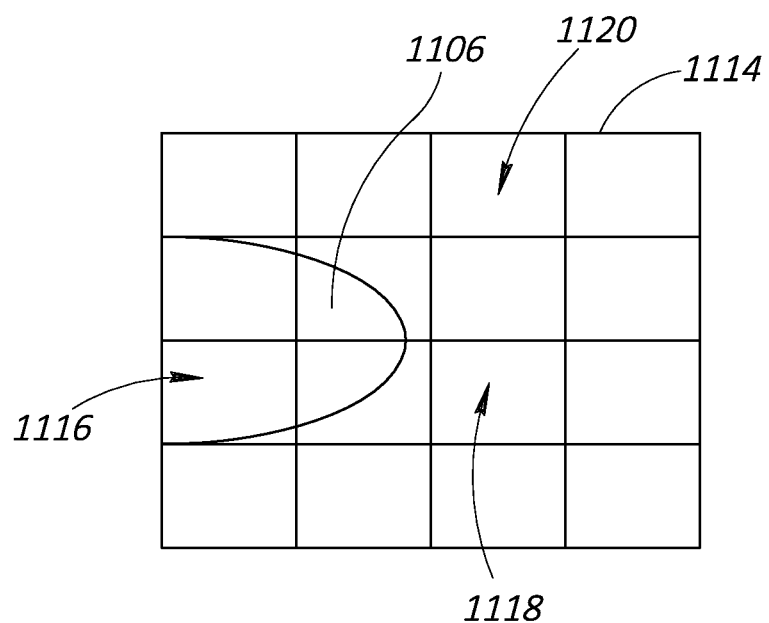

FIGS. 12A-C are various views of the head movement detection system with the user 1102 titling their head away from their shoulder and the corresponding view from the ranging sensor. FIG. 12A depicts a front view and FIG. 12B depicts a top down view of the user 1102 wearing the wearable device 1100.

In FIG. 12A the user 1102 has tilted their head 1104 away from their shoulder 1106. This movement has caused the ranging sensor 1110 to increase in height above the shoulder and also to increase an angle off of straight down as the head pivots at a neck of the user 1102 to tilt. Therefore, the distance value of distance 1112 has increased with respect to the baseline position of FIGS. 11A-C.

FIG. 12B depicts a top down view of the head tilted away position. Because of the increased distance between the ranging sensor 1110 and the shoulder 1106, the field of view 1114 has increased in area. The increase in area of the field of view 1114 is because the cross-sectional area of the field of view 1114 increases with distance, as discussed previously. Also, the center of the focus of the field of view 1114 has moved to the end of the shoulder 1106.

FIG. 12C depicts a distance map (grid) of a multiple zone embodiment of the ranging sensor 1110 overlaid over a view from the perspective of the ranging sensor 1110 of the shoulder 1106 from FIGS. 12A, 12B. The distance map is bound by the field of view of 1114 of the ranging sensor 1110, thus only part of the user 1102 visible is the shoulder 1106. Because the user 1102 is in the head tilted away position without any rotation, there is a symmetrical view from top to bottom of the distance map. The distance map has a grid representing the different spatial zones.

Using the representative scale from FIGS. 11A-C, in FIG. 12C the first grid box 1116 is mostly filled by the center of the shoulder 1106 at a distance associated with the head tilted away position and thus has a distance value of 7 and a reflectivity value of 9. The second and third grid boxes 1118, 1120 are vacant and thus have a distance value of 10 and a reflectivity value of 0.

Figure 13A:
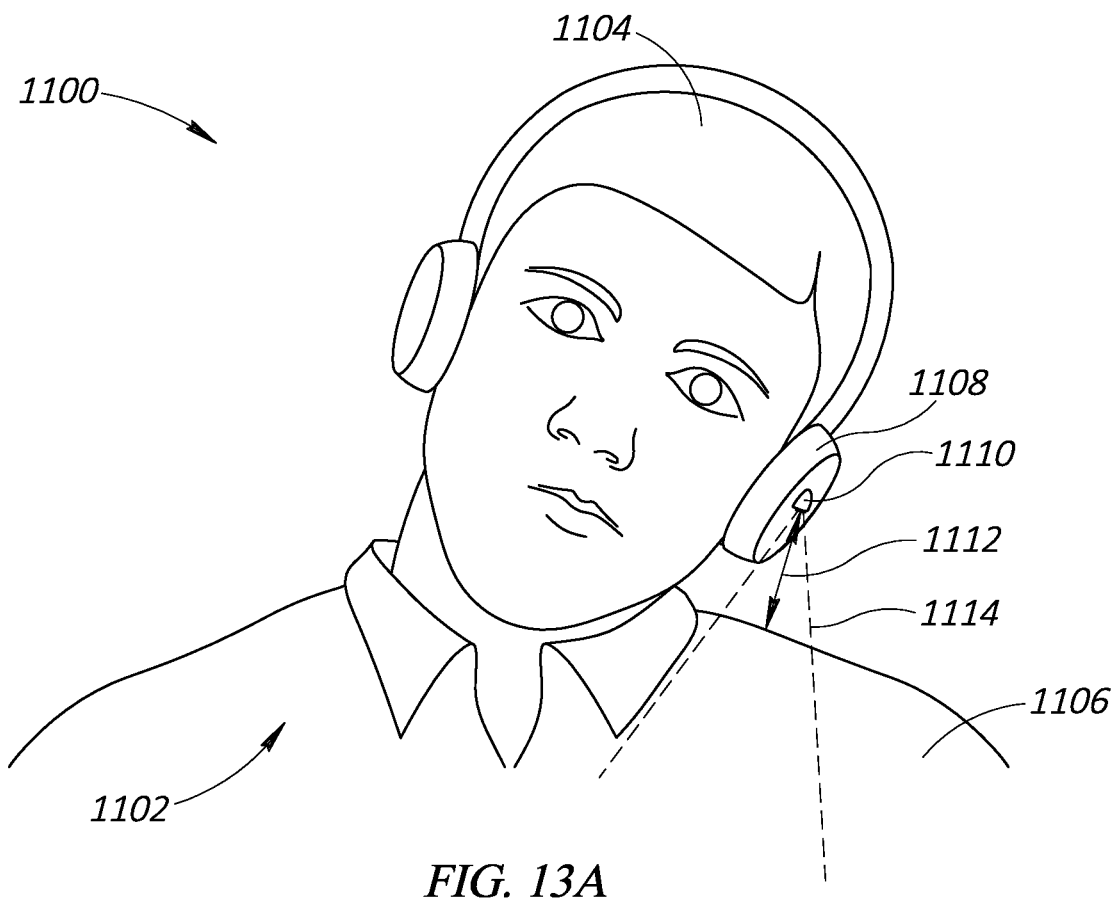
FIGS. 13A-C are various views of the head movement detection system with the user titling their head toward their shoulder and the corresponding view from the ranging sensor.
Figure 13B:
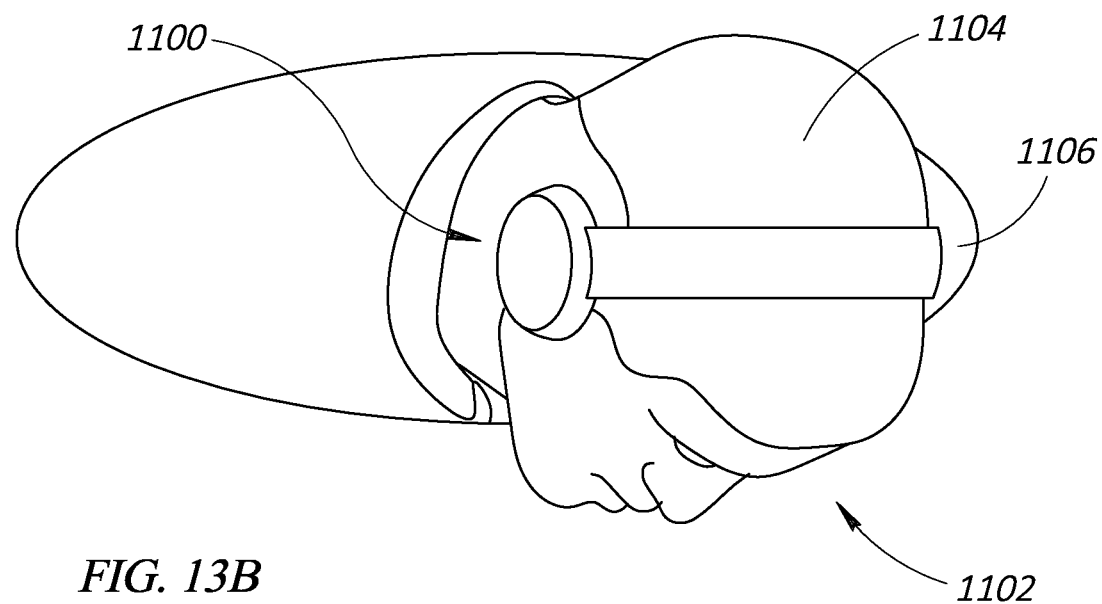
Figure 13C:
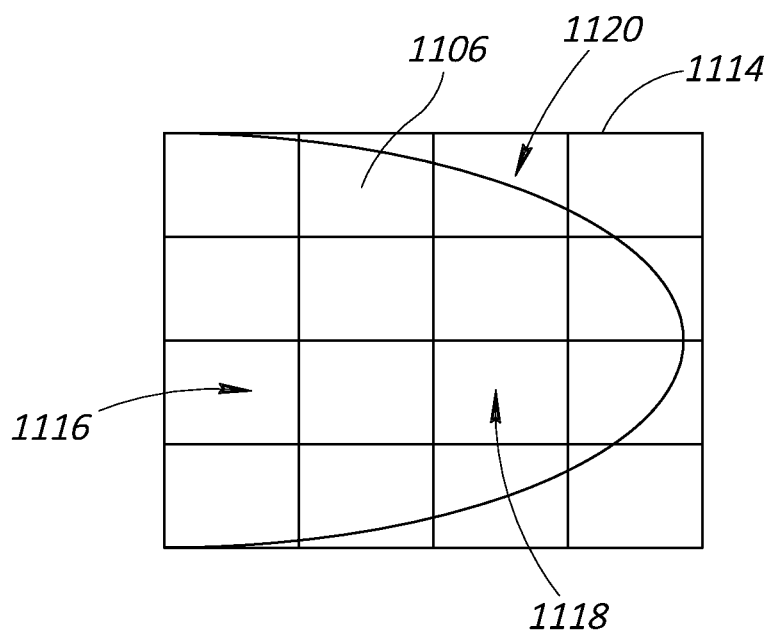

FIGS. 13A-C are various views of the head movement detection system with the user 1102 titling their head toward their shoulder and the corresponding view from the ranging sensor. FIG. 13A depicts a front view and FIG. 13B depicts a top down view of the user 1102 wearing the wearable device 1100.

In FIG. 13A the user 1102 has tilted their head 1104 toward their shoulder 1106. This movement has caused the ranging sensor 1110 to decrease in height above the shoulder and also to invert an angle off of straight down compared to FIG. 11A as the head pivots at the neck of the user 1102 to tilt. Therefore, the distance value of distance 1112 has decreased with respect to the baseline position of FIGS. 11A-C.

FIG. 13B depicts a top down view of the head tilted towards position. Because of the decreased distance between the ranging sensor 1110 and the shoulder 1106, the field of view 1114 has decreased in area. The decrease in area of the field of view 1114 is because the cross-sectional area of the field of view 1114 increases with distance, as discussed previously. Also, the center of the focus of the field of view 1114 has moved to the base of the shoulder 1106.

FIG. 13C depicts a distance map (grid) of a multiple zone embodiment of the ranging sensor 1110 overlaid over a view from the perspective of the ranging sensor 1110 of the shoulder 1106 from FIGS. 13A, 13B. The distance map is bound by the field of view of 1114 of the ranging sensor 1110, thus only part of the user 1102 visible is the shoulder 1106. Because the user 1102 is in the head tilted toward position without any rotation, there is a symmetrical view from top to bottom of the distance map. The distance map has a grid representing the different spatial zones.

Using the representative scale from FIGS. 11A-C, the first and second grid boxes 1116, 1118 are completely filled by a part of the shoulder 1106 at a distance associated with the head tilted toward position and thus have a distance value of 2 and a reflectivity value of 10. The third grid box 1120 is a little less than half filled by a back part of the shoulder 1106 at a distance associated with the head tilted toward position and thus has a distance value of 3 and a reflectivity value of 5. The distance value of the first and second grid boxes 1116, 1118 is less than the distance value of the third grid box 1120 in this orientation because the front and back of the shoulder 1106 slopes down compared to a centerline from base to end of the shoulder 1106 causing an increase in measured distance.

Figure 14A:
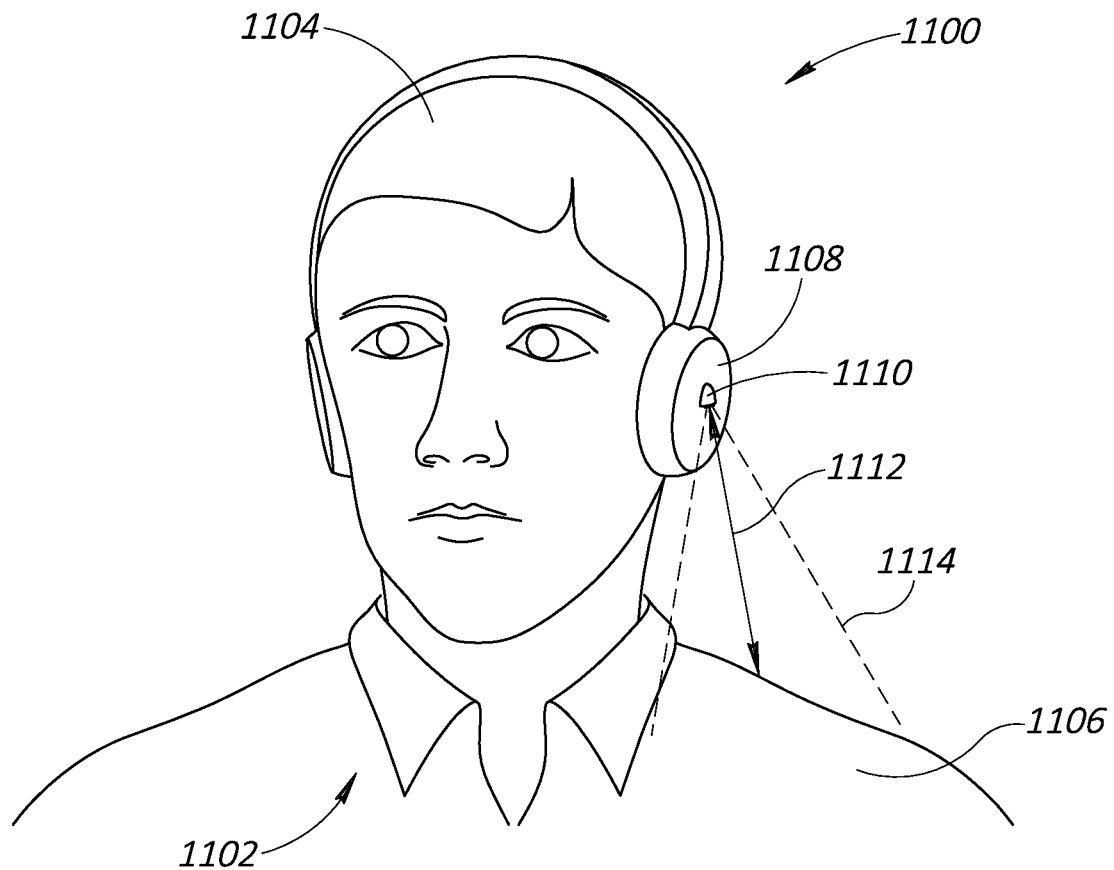
FIGS. 14A-C are various views of the head movement detection system with the user rotating their head and the corresponding view from the ranging sensor.
Figure 14B:
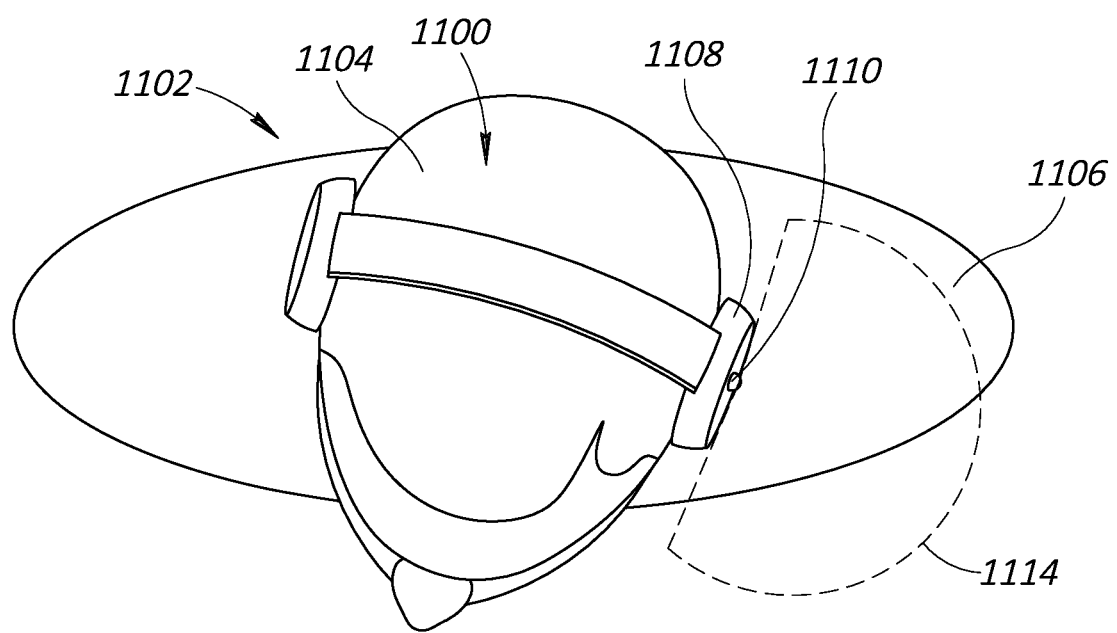
Figure 14C:
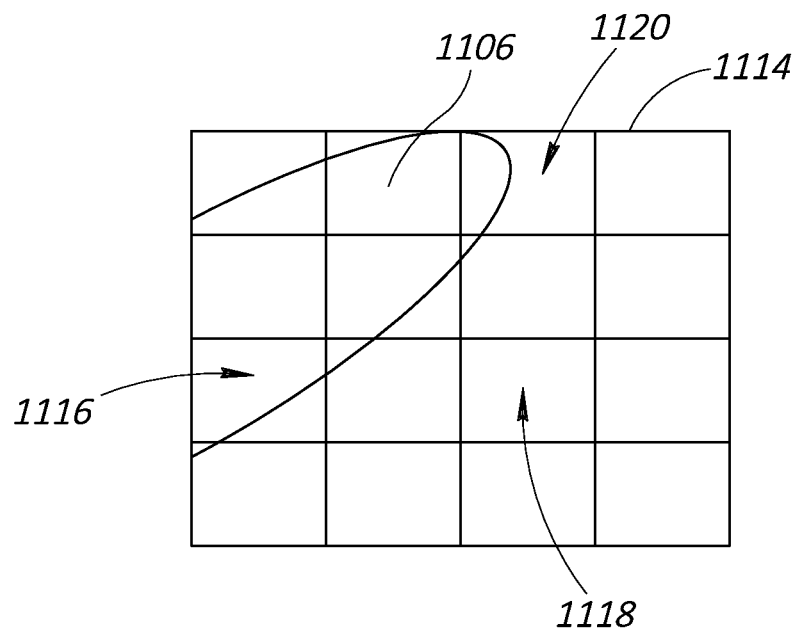

FIGS. 14A-C are various views of the head movement detection system with the user 1102 rotating their head and the corresponding view from the ranging sensor. FIG. 14A depicts a front view and FIG. 14B depicts a top down view of the user 1102 wearing the wearable device 1100.

In FIG. 14A the user 1102 has rotated their head 1104 away from their shoulder 1106. This movement has caused the ranging sensor 1110 to increase in distance to the shoulder and also to change the position of the shoulder in the field of view 1114 as the head pivots at the neck of the user 1102 to rotate. Therefore, the distance value of distance 1112 has stayed approximately the same with respect to the baseline position of FIGS. 11A-C.

FIG. 14B depicts a top down view of the head rotated away position. Because of the approximately same distance between the ranging sensor 1110 and the shoulder 1106, the field of view 1114 has remained the same in area. However, the center of the focus of the field of view 1114 has moved to the front of the shoulder 1106.

FIG. 14C depicts a distance map (grid) of a multiple zone embodiment of the ranging sensor 1110 overlaid over a view from the perspective of the ranging sensor 1110 of the shoulder 1106 from FIGS. 14A, 14B. The distance map is bound by the field of view of 1114 of the ranging sensor 1110, thus only part of the user 1102 visible is the shoulder 1106. Because the user 1102 is in the head rotated away position, there is an asymmetrical view from top to bottom of the distance map. The distance map has a grid representing the different spatial zones.

Using the representative scale from FIGS. 11A-C, in FIG. 14C the first grid box 1116 is mostly filled by a part of the shoulder 1106 near the base and at a distance associated with the head rotated away position and thus has a distance value of 6 and a reflectivity value of 7. The distance of the first grid box 1116 in the baseline position is less than the distance of the first grid box 1116 in the head rotated away position because the front and back of the shoulder 1106 slopes down compared to a centerline from base to end of the shoulder 1106 causing an increase in measured distance. The second box 1118 is vacant and thus has a distance value of 10 and a reflectivity value of 0. The third grid box 1120 is a less than half filled by a front end part of the shoulder 1106 at a distance associated with the head rotated away position and thus has a distance value of 6 and a reflectivity value of 3. The distance of the second grid box 1118 in the baseline position is less than the distance of the third grid box 1120 in the head rotated away position because the front of the shoulder 1106 is farther away from the ranging sensor due to the rotating of the head 1104.

Figure 15:
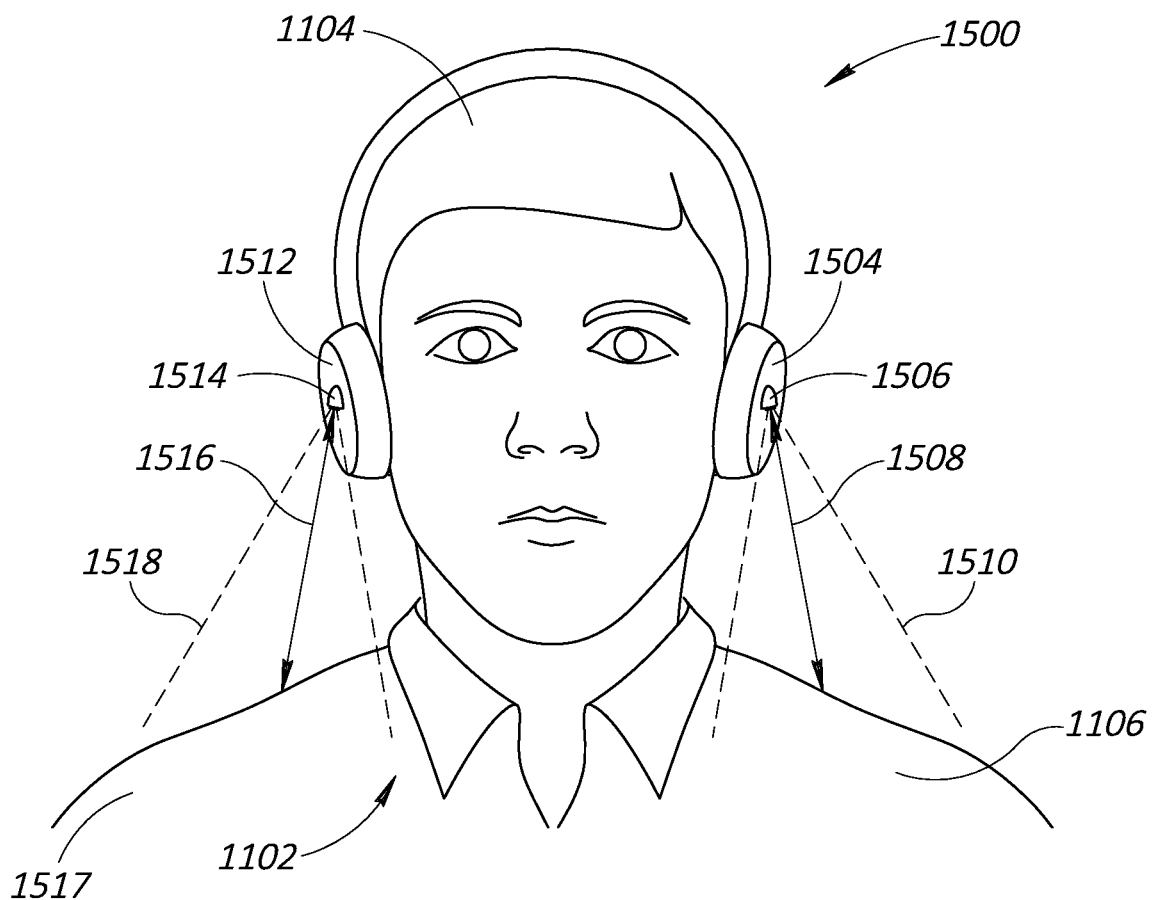
FIG. 15 is a view of an alternate embodiment of the head detection system having two ranging sensors.

FIG. 15 is a view of an alternate embodiment of the head detection system having two ranging sensors. A wearable device 1500 is shown being worn by the user 1102. For ease of understanding, the wearable device 1500 is depicted as being a set of headphones; however, any of the wearable devices discussed in the present disclosure may include similar components and functionality.

The wearable device includes a first earpiece 1504. The first earpiece 1504, in this embodiment, is an over-the-ear speaker that is one of a pair of speakers that provide a stereo audio signal each to a different ear of the user 1102. The first earpiece 1504 has on its exterior surface a ranging sensor 1506. The ranging sensor 1506 is any one of the ranging sensors described in the present disclosure, such as an optical TOF ranging sensor. The ranging sensor 1506 is shown mounted on an exterior surface, but in other embodiments the ranging sensor may be embedded in the first earpiece 1504 or is coupled to any other supporting structure of the wearable device 1500.

The ranging sensor 1506 detects a distance 1508 from the ranging sensor 1506 to the shoulder 1106. Based on an initial calibration, the distance 1508 shown in FIG. 15 reflects a distance corresponding to the head being in an upright, looking forward, natural, and unstrained baseline position. By analyzing the time of flight of the ranging signal, the ranging sensor 1506 can be used to determine a distance from the ranging sensor 1506 on the first earpiece 1504 to the shoulder 1106 of the user 1102.

The ranging sensor 1506 also has a field of view 1510 that projects away from the ranging sensor 1506 and grows in cross-sectional area with distance. The ranging sensor 1506 detects objects within the field of view 1510. The field of view 1510 is shown pointing down at a slight angle off of straight down to be positioned centered on the shoulder 1106 when the user 1102 is in the baseline position. In other embodiments the field of view 1510 may be positioned so part or all of the field of view 1510 is off of the shoulder 1106 in the baseline position. The ranging sensor 1506 also detects a reflectivity, or power level, of the ranging signal. By analyzing the reflectivity of the ranging signal, the ranging sensor 1506 can be used to determine a percent of coverage of the field of view 1510 because greater coverage of the field of view 1510 will cause more of the ranging signal to be reflected and less coverage of the field of view 1510 will cause less of the ranging signal to be reflected.

The wearable device also includes a second earpiece 1512. The second earpiece 1512, in this embodiment, is an over-the-ear speaker that is one of the pair of speakers that provide a stereo audio signal to different ears of the user 1102. The second earpiece 1512 has on its exterior surface a ranging sensor 1514. The ranging sensor 1514 is any one of the ranging sensors described in the present disclosure, such as an optical TOF ranging sensor. The ranging sensor 1514 is shown mounted on an exterior surface, but in other embodiments the ranging sensor may be embedded in the second earpiece 1512 or is coupled to any other supporting structure of the wearable device 1500.

The ranging sensor 1514 detects a distance 1516 from the ranging sensor 1514 to a shoulder 1517. Based on an initial calibration, the distance 1516 shown in FIG. 15 reflects a distance corresponding to the head being in an upright, looking forward, natural, and unstrained baseline position. By analyzing the time of flight of the ranging signal, the ranging sensor 1514 can be used to determine a distance from the ranging sensor 1514 on the second earpiece 1512 to the shoulder 1517 of the user 1102.

The ranging sensor 1514 also has a field of view 1518 that projects away from the ranging sensor 1514 and grows in cross-sectional area with distance. The ranging sensor 1514 detects objects within the field of view 1518. The field of view 1518 is shown pointing down at a slight angle off of straight down to be positioned centered on the shoulder 1517 when the user 1102 is in the baseline position. In other embodiments the field of view 1518 may be positioned so part or all of the field of view 1510 is off of the shoulder 1517 in the baseline position. The ranging sensor 1514 detects a reflectivity, or power level, of the ranging signal. By analyzing the reflectivity of the ranging signal, the ranging sensor 1514 can be used to determine a percent of coverage of the field of view 1518 because greater coverage of the field of view 1518 will cause more of the ranging signal to be reflected and less coverage of the field of view 1518 will cause less of the ranging signal to be reflected.

In one embodiment, inferences can be made on head rotation based on the distance values. For example, if the distance 1508 increases and the distance 1516 decreases, an inference can be made that the head 1102 is being tilted away from shoulder 1106 and towards shoulder 1517. If the distance 1508 decreases and the distance 1516 increases, an inference can be made that the head 1102 is being tilted toward shoulder 1106 and away from shoulder 1517. If both the distances 1508 and 1516 are decreasing an inference can be made that the head 1102 is being rotated or pitched up and down, and if both the distances 1508 and 1516 are increasing an inference can be made that the head 1102 is being rotated or pitched to baseline position. In other embodiments, the ranging sensors 1506 and 1514 can be located on the same earpiece and compared to one another. With at least two sensors it is possible to detect the direction of head turns. The ranging data can also be combined with ranging data from other ranging sensors or any other sensor, such as a gyroscope/accelerometer/IMU to develop a blended solution, such as by using the ranging sensor to generate a movement vector and using a gyroscope to generate a movement vector, and taking the average of those two vectors. Other blended solutions may be used, such as different weights like 60-70% gyroscope vector and 40-30% ranging vector.

In various embodiments, the wearable device can include additional time of flight sensors positioned on various locations of the wearable device. These additional sensors can detect distances from their position on wearable device to the user's body. For example, a first sensor positioned by the right ear of the user and a second sensor positioned by the left ear of the user will output distance information that is complimentary and can be processed together to identify more information about the movement of the user's head. As noted above, the ranging sensors are low power with significant distance information. Each sensor can output either a single distance reading for each time interval of measurement or can output multiple distances per reading, at very low cost to the system.

U.S. Provisional Patent Application No. 62/614,315 is incorporated by reference in its entirety. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a supporting structure having a shape corresponding to a head of a user;
a first distance detection sensor coupled to the supporting structure; and
a processor electrically coupled to the first distance detection sensor and configured to:
receive a first measurement obtained by the first distance detection sensor at a first time, the first measurement being a measurement of a distance between the first distance detection sensor and a first portion of a body of the user at the first time;
receive a second measurement obtained by the first distance detection sensor at a second time, the second measurement being a measurement of a distance between the first distance detection sensor and the first portion of the body of the user at the second time; and
determine a position of the head based at least in part on the first measurement and the second measurement.

2. The system of claim 1, wherein the first portion of the body is a shoulder of the user.

3. The system of claim 1 wherein the first distance detection sensor is a multiple zone time of flight ranging sensor configured to detect a plurality of distances for different spatial zones.

4. The system of claim 1, further comprising a second distance detection sensor coupled to the supporting structure.

5. The system of claim 4, wherein the processor is electrically coupled to the second distance detection sensor, and the processor is configured to determine the position of the head based on a third measurement by the second distance detection sensor.

6. The system of claim 5 wherein the first portion of the body is a first shoulder of the user, the third measurement is a measurement of a distance between the second distance detection sensor and a second shoulder of the user, and the processor is configured to:
receive the third measurement detected by the second distance detection sensor.

7. The system of claim 1 wherein the first distance detection sensor is configured to detect a first reflectivity of a first ranging signal.

8. The system of claim 7, further comprising:
a second distance detection sensor coupled to the supporting structure and configured to detect a second reflectivity of a second ranging signal, wherein the processor is configured to determine the position of the head based at least in part on the first reflectivity and the second reflectivity.

9. The system of claim 1, further comprising a display screen coupled to the supporting structure.

10. The system of claim 1, wherein the first measurement and the second measurement each include an array of reflectivity values for different spatial zones.

11. A method, comprising:
receiving, by a processor, a first measurement obtained by a first distance detection sensor at a first time, the processor being electrically coupled to the first distance detection sensor, the first distance detection sensor being coupled to a supporting structure having a shape corresponding to a head of a user, the first measurement being a measurement of a distance between the first distance detection sensor and a first portion of a body of the user at the first time;
receiving, by the processor, a second measurement obtained by the first distance detection sensor at a second time, the second measurement being a measurement of a distance between the first distance detection sensor and the first portion of the body of the user at the second time; and
determining, by the processor, a position of the head of the user based at least in part on the first measurement and the second measurement.

12. The method of claim 11 wherein and first portion of the body is a first shoulder of the user.

13. The method of claim 12, comprising:
receiving, by the processor, a third measurement obtained by a second distance detection sensor, the third measurement being a measurement of a distance between the second distance detection sensor and a second shoulder of the user,
determining, by the processor, the position of the head of the user based at least in part on the third measurement.

14. The method of claim 11 wherein the first ranging sensor is a time-of-flight ranging sensor.

15. A system, comprising:
a supporting structure having a shape corresponding to a head of a user;
a first distance detection sensor coupled to the supporting structure;
a second distance detection sensor coupled to the supporting structure; and
a processor electrically coupled to the first distance detection sensor and the second distance detection sensor, the processor configured to:

receive a first measurement obtained by the first distance detection sensor, the first measurement being a measurement of a distance between the first distance detection sensor and a first portion of a body of the user;

receive the second measurement obtained by the second distance detection sensor, the second measurement being a measurement of a distance between the second distance detection sensor and a second portion of the body of the user, the second portion being different from the first portion; and determine a position of the head based at least in part on the first measurement and the second measurement.

16. The system of claim 15 wherein
the first distance detection sensor is positioned on a first side of the supporting structure, and
the second distance detection sensor is positioned on a second side, opposite to the first side, of the supporting structure.

17. The system of claim 15 wherein the first portion is a first shoulder of the user, and the second portion is a second shoulder of the user.

18. The system of claim 15 wherein
the processor is configured to receive a third measurement obtained by the first distance detection sensor,
the third measurement is a measurement of a distance between the first distance detection sensor and the first portion of the body of the user, and
the processor is configured to determine another position of the head based at least in part on the first measurement and the third measurement.

* * * * *

UNITED STATES PATENT AND TRADEMARK OFFICE
CERTIFICATE OF CORRECTION

PATENT NO. : 10,845,870 B2
APPLICATION NO. : 16/101131
DATED : November 24, 2020
INVENTOR(S) : Xiaoyong Yang et al.

It is certified that error appears in the above-identified patent and that said Letters Patent is hereby corrected as shown below:

In the Claims

Column 20, Line 46, Claim 12:
"wherein and first" should read, --wherein the first--.

Signed and Sealed this
Fifth Day of January, 2021

Andrei Iancu
*Director of the United States Patent and Trademark Office*